(12) United States Patent
Chang

(10) Patent No.: US 8,111,646 B1
(45) Date of Patent: Feb. 7, 2012

(54) COMMUNICATION SYSTEM FOR DYNAMICALLY COMBINING POWER FROM A PLURALITY OF PROPAGATION CHANNELS IN ORDER TO IMPROVE POWER LEVELS OF TRANSMITTED SIGNALS WITHOUT AFFECTING RECEIVER AND PROPAGATION SEGMENTS

(76) Inventor: Donald C. D. Chang, Thousand Oaks, CA (US)

( * ) Notice: Subject to any disclaimer, the term of this patent is extended or adjusted under 35 U.S.C. 154(b) by 326 days.

(21) Appl. No.: 12/462,145

(22) Filed: Jul. 30, 2009

(51) Int. Cl.
*H04B 7/185* (2006.01)
*H03H 7/30* (2006.01)
*H04L 27/00* (2006.01)

(52) U.S. Cl. ........ 370/316; 370/318; 375/229; 375/232; 375/295

(58) Field of Classification Search .................. 370/316, 370/318; 375/229, 232, 295
See application file for complete search history.

(56) References Cited

U.S. PATENT DOCUMENTS

| | | | |
|---|---|---|---|
| 7,068,616 B2 | 6/2006 | Chang et al. | |
| 7,339,520 B2 | 3/2008 | Chang et al. | |
| 2008/0291864 A1* | 11/2008 | Chang | 370/316 |
| 2009/0034448 A1* | 2/2009 | Miller et al. | 370/316 |
| 2009/0110033 A1* | 4/2009 | Shattil | 375/141 |
| 2009/0175367 A1* | 7/2009 | Kishigami et al. | 375/260 |

* cited by examiner

*Primary Examiner* — Huy Vu
*Assistant Examiner* — Brandon Renner
(74) *Attorney, Agent, or Firm* — Tope-McKay & Associates

(57) ABSTRACT

The present invention relates to a communication system and method that allows a transmitter segment (ground end of uplink segment) to dynamically combine power from plurality of propagation channels (transponders) in order to improve power levels of signals being transmitted, without affecting the receiver segment (user end of downlink segment) and the propagation segment (space segment), and without modifying the configuration of the propagation apparatus (satellite). Specifically, the transmitter segment generates mixtures of input signals by using Wavefront-Multiplexing and transmits the wavefront-multiplexed (WFM) signals through propagation channels to a receiver segment that coherently separates the mixtures of received WFM signals by using adaptive equalization and Wavefront-De-Multiplexing. The WFM signal mixtures allow an operator, or automated system, at the transmitter segment to dynamically allocate equivalent channel (transponder) powers according to continuously changing market demands by dynamically including change of relative input powers into ratios of the WFM signal mixtures being transmitted.

64 Claims, 8 Drawing Sheets

400a

| weighting vectors phase | Input | | | |
|---|---|---|---|---|
| Output | X1 | X2 | X3 | X4 |
| Y1 | -90 | 45 | 180 | -45 |
| Y2 | 45 | 90 | 135 | 180 |
| Y3 | 180 | 135 | 90 | 45 |
| Y4 | -45 | 180 | 45 | -90 |

(a)

400b

| weighting vectors phase | Input | | | |
|---|---|---|---|---|
| Output | X1 | X2 | X3 | X4 |
| Y1 | 0 | 90 | 90 | 180 |
| Y2 | 90 | 0 | 180 | 90 |
| Y3 | 180 | 90 | 90 | 0 |
| Y4 | 90 | 180 | 0 | 90 |

Examples (400a and 400b) of vector weights by phase Φnm in degrees for an orthogonal transform matrix used to implement an embodiment of the Wavefront Multiplexing transform (-2000 dBw) is defined as 0 watt

COMMUNICATION SYSTEM FOR DYNAMICALLY COMBINING POWER FROM A PLURALITY OF PROPAGATION CHANNELS IN ORDER TO IMPROVE POWER LEVELS OF TRANSMITTED SIGNALS WITHOUT AFFECTING RECEIVER AND PROPAGATION SEGMENTS

BACKGROUND OF THE INVENTION (1) Technical Field

The present invention relates to the fields of communications systems and computer networks and, in particular, to satellite networks, Direct-Broadcast-Service (DBS) broadcasting architectures, DBS uplink terminals, and DBS receive only subscriber ground terminals. More specifically, but without limitation thereto, the present invention pertains to a communication system and method that allows a transmitter segment (operator at uplink segment) to dynamically combine power from plurality of propagation channels (transponders) in order to improve power levels of signals being transmitted, without affecting the receiver segment (downlink segment) and the propagation segment (space segment), and without modifying the configuration of the propagation apparatus (satellite).

(2) Description of Related Art

Current direct-broadcast-service (DBS) satellite networks deliver many television (TV) programs over coverage areas via dedicated broadcasting satellites in geostationary orbits. DBS refers to satellite TV systems in which the subscribers, or end users, receive signals directly from geostationary satellites. A DBS subscriber installation consists of a dish antenna with a diameter between 50 to 90 centimeters, a conventional TV set, a signal converter placed next to the TV set (the set-top box), and a length of coaxial cable between the dish and the converter. Generally, the dish antenna intercepts the microwave signals transmitted directly from the satellite and the converter produces output signals that can be viewed on the TV receiver.

At the present time, the geostationary satellite orbit is the style most widely used for broadcasting, where the satellite is in an equatorial orbit and appears to be at a fixed point in the sky relative to an observer on the earth. The trend in the industry is to traditionally use the satellite in the "bent pipe" mode, where, as the term suggests, the satellite acts like a slingshot to redirect the incoming signal to different locations on earth. As a result, video coverage of an event at one place on the globe can be sent up to a satellite and redistributed (broadcast) over large areas of the populated world in the form of clear television pictures.

Generally, the signals are broadcast in digital format at microwave frequencies above $10^{10}$ Hertz (upper portion of the microwave Ku frequency band). As a result, the downlink, from satellite to earth, operates at frequencies between 12.2 Gigahertz (GHz) and 12.7 GHz. Accordingly, geo-satellite based direct TV broadcasting systems features high power Ku-satellites (transmitting at microwave frequencies above 10 GHz) and receiving-only ground terminals with small dishes. These satellite systems are very attractive for satisfying the wide area of coverage and the point-to-multipoint nature required for broadcasting.

Currently, operators over North America for full continental United States coverage utilize a group of multiple high-power or medium power satellites. These satellites fall into the category of either Broadcasting Satellite Service (BSS) or Fixed Satellite Service (FSS). Each satellite has many transponders, analogous to channels on a television receiver except that each transponder is capable of carrying many television signals simultaneously. These satellites, with maximum angular separations less than 25° in the geostationary arc, form a mini-constellation that can be simultaneously viewed by small, fixed, and round DBS antennas.

Perhaps, the two most important and most limiting assets of broadcasting satellites are the total available "satellite bandwidth" and "radiated power." Although the information carrying capacity of satellites has been expanding steadily over the years since its inception, the available satellite bandwidth is still very small compared to the optical fiber bandwidth capabilities. This is particularly critical for the case of video transmission or high-speed data throughput, where there are severe limitations affecting the large bandwidth required by these transmissions. Progress in digital compression techniques is gradually reducing the bandwidth needed for video transmission. However, full-motion video still requires several Megabits per second.

Regarding the radiated power requirements of satellite communication systems, the radiated power levels and coverage antenna gains of broadcasting satellites dictate and limit the size and availability of subscriber terminals. As the technology moved forward in the last two decades, the available power for communications payloads on satellites increased from less than 100 watts (W) to over twenty kilowatts (20 kW).

Usually, satellite designs are initially optimized and balanced on both satellite bandwidth frequency and power assets for a given mission requirement, wherein it is considered to be a good practice to have both assets equally balanced, such as not to allow one of the two assets to reserve more space than the other. However, as time passes by, the mission requirement may change in time in a highly dynamic business environment. Therefore, the initial designs with balanced satellite assets may become non-optimal, as time passes by, and excessive space frequency and/or excessive power assets may become available for other applications at some points in time. As such, there is a need for a dynamic communication system that will take advantage of these free excessive power satellite assets dynamically available at some points in time to be utilized for other applications.

For the foregoing reasons, there is a great need in satellite communications for a system that allows an operator to dynamically allocate any existing available excess satellite radiated power to various programs (signals being transmitted) via multiple transponders in a satellite, or among multiple satellites, in order to improve the power levels of the various programs (signals being transmitted). Furthermore, there is a need for the dynamic power allocation to be controlled by the uplink segment (terminals or transmitter segment) without affecting the user-end of downlink segment (receiver segment) and the space segment (propagation segment), and without modifying the satellite configuration. In addition, for the dynamic power allocation to be successful, the receiving-only terminals must "coherently combine" the radiated power from the various transponders in order to enhance different broadcasting programs.

An embodiment of the present invention involves a dynamic improvement of radiated power over coverage areas by utilizing additional transponders on a satellite or from different satellites that are not being utilized at their full capacity and that have excessive (unused) radiated power available to be utilized, where the effective dynamic power allocations are utilized and implemented through the ground segment (transmitter segment or uplink segment) only, without affecting the space segment (propagation segment) configuration at all.

In addition to applications in satellite communications, there is a great need in communication systems in general to allow a user or an automated transmission system (transmitter segment) to dynamically allocate any existing available excess radiated power from propagation channels (in the propagation segment) to various applications, in order to improve power levels of transmitted signals and without affecting the receiver segment and the propagation segment (transmission medium, propagation apparatus, and propagation channels) of the communication system, and without modifying the configuration (infrastructure) of the propagation apparatus and propagation channels.

Some non-limiting and non-exhaustive examples of such communications systems (needing to dynamically allocate existing excess power available from propagation channels in order to improve power levels of transmitted signals without affecting the receiver segment and the propagation segment) are: wireless communication systems, fiber optical communication systems, wire communication systems, radio frequency communication systems, satellite communication systems, sonar communication systems, radar communication systems, laser communication systems, internet communication systems, communication systems between a vehicle and a satellite, communication systems between a least two vehicles, internal vehicle communication systems between the various operating subsystems within a vehicle, and any communication systems resulting from a combination of at least two of these communication systems therein.

The following references are presented for further background information:

[1] D. Chang, W. Mayfield, J. Novak III, and F. Taormina, "Phased Array Terminal for Equatorial Satellite Constellations," U.S. Pat. No. 7,339,520, Mar. 4, 2008; and

[2] D. Chang, W. Lim, and M. Chang, "Multiple Dynamic Connectivity for Satellite Communications Systems," U.S. Pat. No. 7,068,616, Jun. 27, 2006.

SUMMARY OF THE INVENTION

The present invention provides a dynamic communication system suitable for dynamically combining power from a plurality of propagation channels in order to improve power levels of transmitted signals, wherein dynamic power allocation is implemented through a transmitter segment without affecting receiver segment and propagation segment, and without modifying the configuration of the propagation apparatus, the system comprising: a processor and a memory coupled with the processor. The dynamic communication system further comprises an input coupled with the processor for receiving a plurality of signals to be transmitted. Generally, the transmitter segment generates mixtures of the input signals to be transmitted by using a Wavefront-Multiplexing transform and transmits the wavefront-multiplexed (WFM) signals, through propagation channels, to a receiver segment. In turn, the receiver segment (using adaptive equalization and Wavefront-De-Multiplexing) coherently separates the mixtures of received WFM signals into the individual spatial-domain signals that were initially inputted into the system to be transmitted. The WFM signal mixtures allow an operator, or an automated system, at the transmitter segment to dynamically allocate equivalent channel (transponder) powers according to continuously changing market demands by dynamically including change of relative input powers into ratios of the WFM signal mixtures being transmitted.

Furthermore, the dynamic communication system comprises an output coupled with the processor for outputting the individual spatial-domain signals that were coherently separated by the receiver segment, and instruction means residing in its processor and memory, such that the instruction means are executable by the processor for causing the processor to perform operations of: transforming the input signals by performing a Wavefront-Multiplexing transform (WFM transform); transmitting the wavefront multiplexed signals (WFM signals) over a transmission medium through propagation channels, wherein there exist at least as many propagation channels as there exist WFM signals and each WFM signal is transmitted over its own propagation channel; receiving the transmitted WFM signals from the propagation channels; performing adaptive equalization on received WFM signals in order to account for propagation channel effects, wherein the propagation channel effects comprise dynamic differential propagation effects due to the transmission medium and static differential propagation effects comprising unbalanced amplitudes, unbalanced phases, and unbalanced time-delays between the received WFM signals and the WFM signals outputted by the WFM transform; and separating the equalized WFM signals into individual spatial-domain signals by performing a Wavefront-De-Multiplexing transform (WFDM transform). The dynamic communication system outputs, in a computationally efficient manner, the individual spatial-domain signals that were coherently separated by the receiver segment from the mixtures of WFM signals transmitted by the transmitter segment.

An embodiment of the invention selects the dynamic communication system from a group consisting of a: wireless communication system, fiber optical communication system, wire communication system, radio frequency communication system, satellite communication system, sonar communication system, radar communication system, laser communication system, interne communication system, communication system between a vehicle and a satellite, communication system between a least two vehicles, internal vehicle communication system between the various operating subsystems within a vehicle, and a communication system resulting from a combination of at least two of these communication systems therein.

In an embodiment of the invention, an operator or an automated transmission system, at a transmitter segment, dynamically allocates equivalent propagation channel powers according to continuously changing application demands by dynamically including change of relative input powers into ratios of mixtures of the input signals, in order to improve radiated power of the input signals being transmitted. In this embodiment, the dynamic power allocation is implemented through the transmitter segment without affecting receiver segment and propagation segment, and without modifying configuration of a propagation apparatus and the propagation channels in the propagation segment.

In an further embodiment of the invention, the input signals are received at a ground end of an uplink segment and the input signals comprise digital signals, analog signals, mixed analog and digital signals, and a plurality of digital signal streams to be transmitted to a satellite with a number of transponders operating at a plurality of frequencies, wherein there exists at least as many transponders in the satellite as there exist received digital signal streams.

In another embodiment, at the uplink segment (transmitter segment) the system further comprises the operations of: transforming, at the uplink segment, the WFM signals to a satellite frequency band, prior to transmitting the WFM signals to a satellite segment; and uploading, at the uplink segment, the transformed WFM signals to the satellite segment. In this embodiment, the system also further comprises the operations of: transmitting through the satellite transponders, at the satellite segment (propagation segment), the transformed WFM signals to a downlink segment; downloading, at the downlink segment (receiver segment), the transformed WFM signals transmitted from the satellite segment; processing, at a user end of the downlink segment, the downloaded transformed WFM signals to a base-band frequency resulting in base-band frequency WFM signals, wherein the adaptive equalization is performed on the base-band frequency WFM signals in order to account for propagation channel effects from the channels on the transponders of a satellite; recovering the individual spatial-domain digital signal streams received from the transmitting subsystem by amplifying, filtering, synchronizing, and demodulating the individual spatial-domain signals from the WFDM; and outputting the recovered input digital signal streams.

In a further embodiment of the invention, in the operation of separating equalized WFM signals, the WFDM transform equals the unique inverse transform of the WFM transform, whereby the WFDM transform separates the WFM signals into individual spatial-domain signals. Furthermore, in the operation of transforming input signals by WFM, the transformed WFM signals are uploaded from a ground end of the uplink segment to a satellite via an uplink ground antenna and the WFM transform comprises a number of input ports and a number of output ports, where the number of input ports equals the number of output ports and where the number of output ports equals the number of transponders.

In yet another embodiment, the WFM transform further comprises the operations of: inputting digital signal streams to the WFM input ports, wherein an individual WFM input port is connected to only one corresponding input digital signal stream; inputting, at the ground end of uplink segment when there are more transponders than there are input digital signal streams, a control signal into WFM input ports not connected to digital signal streams; inputting, at the ground end of uplink segment when the number of transponders equals the number of digital signal streams, a control signal into a WFM input port connected to a digital signal stream by time-multiplexing the WFM input port between the control signal and the digital signal stream; performing an orthogonal functional transformation from a spatial-domain representation of the inputted digital signal streams to a wavefront-domain representation of the inputted digital signal streams, wherein a necessary and sufficient condition of the WFM transform is that the WFM transform has a realizable unique inverse, and wherein the wavefront representation of the received digital signal streams comprises a plurality of output WFM signals, wherein each output WFM signal is comprised of a unique linear combination of all the received spatial-domain digital signal streams inputted into the WFM transform, and wherein the output WFM signals are orthogonal to one another; and outputting the WFM signals to the WFM output ports.

Another embodiment of the present invention is a one-way communication system selected from a group consisting of: a direct broadcast service (DBS), a fixed satellite service (FSS), a mobile satellite service (MSS), a ground uplink station broadcasting to a ground downlink station, a ground uplink station broadcasting to a user end of downlink segment or to a network hub, a user end of uplink segment transmitting to a user end of downlink segment, a user end of uplink segment transmitting to a network hub or to a ground downlink station, a network hub transmitting to a ground station, and a network hub transmitting to another network hub.

In an embodiment of the operation of performing adaptive equalization, a WFM input port connected to a control signal has a corresponding WFDM controlled output port at the user end of downlink segment, such that the WFDM controlled output ports are used as diagnostic ports, and a cost function is used to measure a difference between controlled input ports and their corresponding diagnostic ports, whereby the cost function is minimal when adaptive equalization is reached. This embodiment of the operation of performing adaptive equalization further utilizes a gradient cost function, an optimization processor, and an amplitude, phase, and time-delay compensation processor.

In the previous embodiment, the adaptive equalization is performed by operations of: measuring the gradient cost function outputted from the WFDM; performing optimization processing on the measured gradient cost function by using a steepest descent technique to reach an optimal solution, wherein the optimal solution corresponds to dynamically eliminating unbalanced amplitudes, unbalanced phases, and unbalanced time-delays between the output WFM signals from the WFM transform and the base-band frequency WFM signals at the user end of the downlink segment, and wherein the optimization processor sends equalization control signals to the amplitude, phase, and time-delay compensation processor; performing amplitude, phase, and time-delay compensation by adjusting the amplitude, phase, and time-delay of the received down-converted WFM signals in accordance to the equalization control signals from the optimization processor in order to reduce the cost function; separating WFM signals from the adaptive equalization operation into individual spatial-domain signals and control signals by performing a WFDM transform; and iterating, at the user end of downlink segment, between the operations of measuring the gradient cost function, performing optimization processing, performing amplitude, phase, and time-delay compensation, and separating the WFM signals from the adaptive equalization operation, until an optimal solution is reached and the cost function is minimal.

In another embodiment of the invention, an operator, at the ground end of uplink segment or at a program aggregation facility for a DBS service, dynamically allocates equivalent transponder powers according to continuously changing market demands by dynamically including change of relative input powers into ratios of mixtures of the input digital signal streams, in order to improve radiated power of the input digital signal streams being broadcasted. In this embodiment, the dynamic power allocation is implemented through the ground end of uplink segment without affecting the user end of downlink segment and the space segment, and without modifying satellite configuration.

In a further embodiment, a plurality of digital signal streams from a transmitting subsystem are transmitted to multiple designated satellites at various orbital slots, wherein the WFM signals are transmitted through a transponder in each satellite, and wherein there exists at least as many transponders available for transmission as there exist received digital signal streams to be transmitted. Furthermore, the WFM signals are uploaded to designated satellites via a multiple beam antenna, multiple antennas, or a combination of multiple beam antenna with multiple antennas at the ground end of uplink segment, and the multiple designated satellites at various orbital slots are accessed by the user end of downlink segment via a multiple beam antenna.

In still a further embodiment, a plurality of input digital signal streams from a transmitting subsystem are transmitted to a plurality of satellite configurations comprised of a satellite, with a number of transponders operating at different frequencies, combined with multiple designated satellites at various orbital slots, such that the WFM signals are transmitted through a transponder in each satellite. In addition, the WFM signals are uploaded to the multiple satellites via a multiple beam antenna, multiple antennas, or a multiple beam antenna combined with multiple antennas at the ground end of uplink segment, and the multiple designated satellites are accessed by a user end of downlink segment via a multiple beam antenna.

An additional embodiment of the invention combines the equalized amplitudes, equalized phases, and equalized time-delays in the equalized WFM signals with associated optimization techniques to perform back channel calibration on mobile satellite communications with ground based beam forming features (GBBF).

In another embodiment, the unique inverse of the WFM transform is equal to the WFM transform and the WFDM transform equals the WFM transform, and the WFM transform is implemented at digital base band in digital format or by analog devices, wherein the analog devices are selected from a group consisting of a Butler Matrix, a Fourier transform pair, and a Hartley transform pair.

A further embodiment of the operation of performing adaptive equalization utilizes a cost function selected from a group consisting of a difference between a controlled input port and its corresponding diagnostic port, Signal to Noise Ratio (SNR), and Bit Error. In this embodiment, the control signals comprise ground (zero value) signals and the gradient cost function corresponds to a sum of detected power levels at the diagnostic ports of the WFDM, whereby when adaptive equalization is reached the gradient cost function is zero and there are no detectable power levels in the diagnostic ports.

In still a further embodiment of the invention, the WFM transform is implemented at digital base band in digital format or by analog devices, wherein the analog devices are selected from a group consisting of a Butler Matrix, a Fourier transform pair, and a Hartley transform pair.

In yet another embodiment of the invention, the unique inverse of the WFM transform is equal to the WFM transform, and the WFDM transform equals the WFM transform.

Another embodiment of the invention is a two-way dynamic satellite communication system comprising at least two transmitter segments and at least two receiver segments, with the transmitter segments comprising a ground end of uplink segment and a user end of uplink segment, and the receiver segments comprising a user end of downlink segment and a ground end of downlink segment, such that the ground segments (uplink and downlink) and the user segments (downlink and uplink) transmit and receive a plurality of digital signal streams back and forth between the ground segments and the user segments.

In this two-way communication embodiment, the user end of uplink segment transmits a plurality of digital signal streams to the ground end of downlink segment via a satellite, with a number of transponders operating at a plurality of frequencies, by performing the operations of: transforming, at the user end uplink segment, digital signal streams by performing a WFM transform; frequency up-converting the output WFM signals to distinct frequency carriers within frequency bands for satellite communications; amplifying frequency up-converted WFM signals and frequency multiplexing (FDM) the amplified WFM signals by utilizing a standard multiplexer (MUX) at the satellite frequency band; uploading WFM signals at the satellite frequency band to the satellite via an uplink user antenna; receiving and frequency translating the carrier frequencies of the WFM signals in the satellite segment; amplifying and transmitting the frequency translated WFM signals through the satellite transponders to the ground end of downlink segment, whereby all designated transponders in the satellite are being utilized to transmit translated WFM signals.

Furthermore, in the two-way communication embodiment, the ground end of downlink segment receives a plurality of digital signal streams from the user end of uplink segment by performing the operations of: receiving and amplifying, at the ground end of downlink segment, the frequency translated WFM signals from the transponders; frequency down-converting the amplified frequency translated WFM signals to a common IF or base-band frequency; performing adaptive equalization on down-converted WFM signals at the ground end of downlink segment; separating equalized WFM signals into individual spatial-domain signals by performing a WFDM transform; and recovering the individual spatial-domain digital signal streams transmitted by the user end of uplink segment by amplifying, filtering, synchronizing, and demodulating the individual spatial-domain signals from the WFDM.

In another two-way communication embodiment, the two-way satellite communication system comprises fixed satellite services (FSS) and mobile satellite services (MSS), selected from a group consisting of: a ground uplink station communicating with a receiving ground station, a user end segment communicating with another user end segment, a user end segment communicating with a network hub or a ground station, a network hub communicating with a ground station, and a network hub communicating with another network hub.

In a two-way communication embodiment of the operation of performing adaptive equalization at the downlink segments (receiver segments), a WFM input port connected to a control signal, at the uplink segments (transmitter segments), has a corresponding WFDM controlled output port at the downlink segments (receiver segments), such that the WFDM controlled output ports are used as diagnostic ports, and a cost function is used to measure a difference between controlled input ports and their corresponding diagnostic ports, whereby the cost function is minimal when adaptive equalization is reached. This two-way communication embodiment of the operation of performing adaptive equalization further utilizes a gradient cost function, an optimization processor, and an amplitude, phase, and time-delay compensation processor.

In the previous two-way communication embodiment, the adaptive equalization is performed by operations of: measuring the gradient cost function outputted from the WFDM; performing optimization processing on the measured gradient cost function by using a steepest descent technique to reach an optimal solution, wherein the optimal solution corresponds to dynamically eliminating unbalanced amplitudes, unbalanced phases, and unbalanced time-delays between the output WFM signals from the WFM transform and the base-band frequency WFM signals at the ground end and user end of the downlink segments, and wherein the optimization processor sends equalization control signals to the amplitude, phase, and time-delay compensation processor; performing amplitude, phase, and time-delay compensation by adjusting the amplitude, phase, and time-delay of the received down-converted WFM signals in accordance to the equalization control signals from the optimization processor in order to reduce the cost function; separating WFM signals from the adaptive equalization operation into individual spatial-domain signals and control signals by performing a WFDM transform; and iterating, at the downlink segments, between the operations of measuring the gradient cost function, performing optimization processing, performing amplitude, phase, and time-delay compensation, and separating the WFM signals from the adaptive equalization operation, until an optimal solution is reached and the cost function is minimal.

In another two-way communication embodiment of the invention, an operator, at the ground end of uplink segment or at the user end of uplink segment, dynamically allocates equivalent transponder powers according to continuously changing market demands by dynamically including change of relative input powers into ratios of mixtures of the input digital signal streams, in order to improve radiated power of the input digital signal streams being broadcasted. In this two-way communication embodiment, the dynamic power allocation is implemented through the uplink segments without affecting the downlink segments and the space segment, and without modifying satellite configuration.

In a further two-way communication embodiment, a plurality of digital signal streams from an uplink segment are transmitted to multiple designated satellites at various orbital slots, wherein the WFM signals are transmitted through a transponder in each satellite, and wherein there exists at least as many transponders available for transmission as there exist received digital signal streams to be transmitted. Furthermore, the WFM signals are uploaded, at the uplink segments, to designated satellites via a multiple beam antenna, multiple antennas, or a combination of multiple beam antenna with multiple antennas, and the multiple designated satellites at various orbital slots are accessed by the downlink segments via a multiple beam antenna, multiple antennas, or a combination of multiple beam antenna with multiple antennas.

In still a further two-way communication embodiment, a plurality of input digital signal streams from the uplink segments are transmitted to a plurality of satellite configurations comprised of a satellite, with a number of transponders operating at different frequencies, combined with multiple designated satellites at various orbital slots, wherein the WFM signals are transmitted through a transponder in each satellite. In addition, the WFM signals are uploaded to the multiple satellites via a multiple beam antenna, multiple antennas, or a multiple beam antenna combined with multiple antennas at the uplink segment, and wherein the multiple designated satellites are accessed by the downlink segments via a multiple beam antenna, multiple antennas, or a combination of multiple beam antenna with multiple antennas.

An additional two-way communication embodiment of the invention combines the equalized amplitudes, equalized phases, and equalized time-delays in the equalized WFM signals with associated optimization techniques to perform back channel calibration on mobile satellite communications with ground based beam forming features (GBBF).

In another two-way communication embodiment, the unique inverse of the WFM transform is equal to the WFM transform and the WFDM transform equals the WFM transform, and the WFM transform is implemented at digital base band in digital format or by analog devices, wherein the analog devices are selected from a group consisting of a Butler Matrix, a Fourier transform pair, and a Hartley transform pair.

A further two-way communication embodiment of the operation of performing adaptive equalization, at the downlink segments, utilizes a cost function selected from a group consisting of a difference between a controlled input port and its corresponding diagnostic port, Signal to Noise Ratio (SNR), and Bit Error. In this two-way embodiment, the control signals comprise ground (zero value) signals and the gradient cost function corresponds to a sum of detected power levels at the diagnostic ports of the WFDM, whereby when adaptive equalization is reached the gradient cost function is zero and there are no detectable power levels in the diagnostic ports.

In still a further two-way communication embodiment of the invention, the WFM transform is implemented at digital base band in digital format or by analog devices, wherein the analog devices are selected from a group consisting of a Butler Matrix, a Fourier transform pair, and a Hartley transform pair.

In yet another two-way communication embodiment of the invention, the unique inverse of the WFM transform is equal to the WFM transform, and the WFDM transform equals the WFM transform.

The features of the above embodiments of the present invention may be combined in many ways to produce a great variety of specific embodiments and aspects of the invention, as will be appreciated by those skilled in the art. Furthermore, the operations which comprise the various embodiments above of the dynamic communication system are analogous to the operations in the various method embodiments of the invention.

BRIEF DESCRIPTION OF THE DRAWINGS

The objects, features and advantages of the present invention will become better understood from the following detailed descriptions of the preferred embodiment of the invention in conjunction with reference to the following appended claims, and accompanying drawings where:

FIG. 4 is a table showing two examples of vector coefficients for an orthogonal transformation matrix used to implement an embodiment of the Wavefront Multiplexing transform.

DETAILED DESCRIPTION

Figure 1:
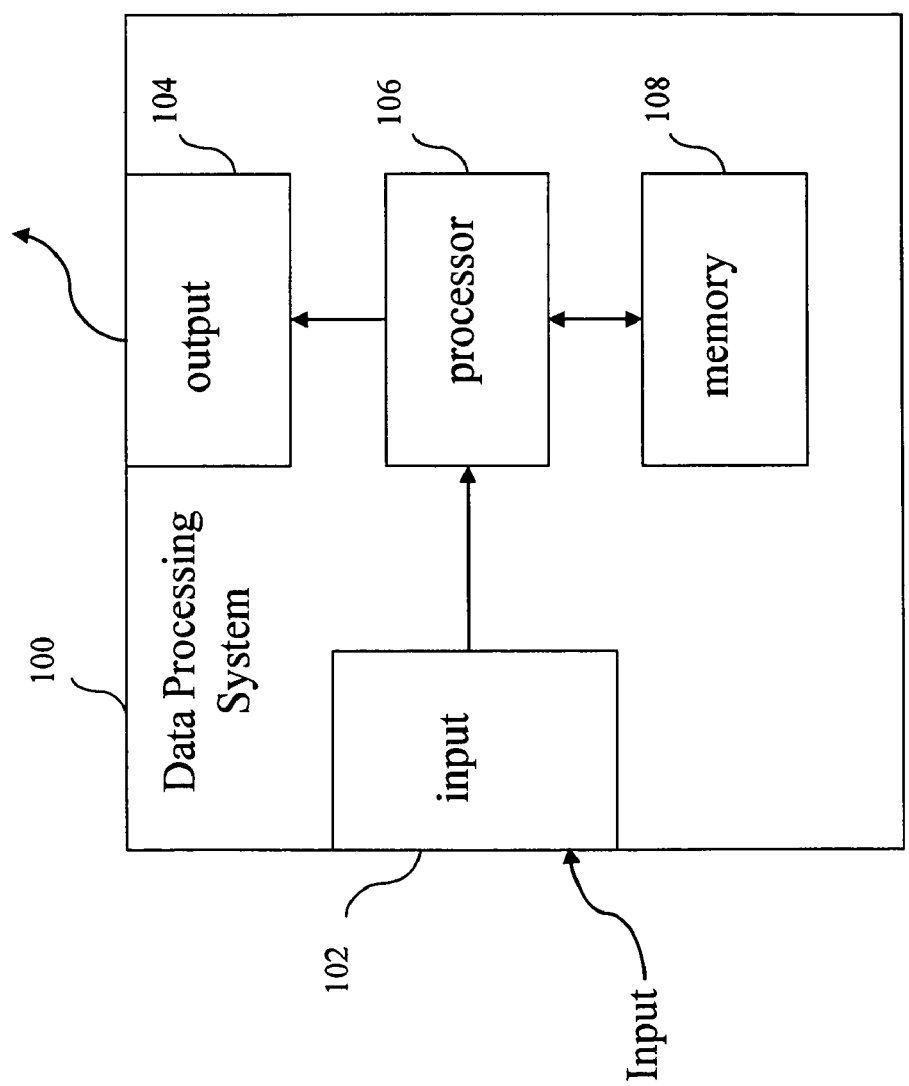
FIG. 1 is an illustrative block diagram depicting the components of a computer system used in the present invention.

The present invention relates to the fields of communications systems and computer networks and, in particular, to satellite networks, Direct-Broadcast-Service (DBS) broadcasting architectures, DBS uplink terminals, and DBS receive only subscriber ground terminals. More specifically, but without limitation thereto, the present invention pertains to a communication system and method that allows a transmitter segment (operator at uplink segment) to dynamically combine power from plurality of propagation channels (transponders) in order to improve power levels of signals being transmitted, without affecting the receiver segment (downlink segment) and the propagation segment (space segment), and without modifying the configuration of the propagation apparatus (satellite).

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles, defined herein, may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

In order to provide a working frame of reference, first a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Next, an overview is presented to provide a general understanding of the scope and meaning of the terms used herein. Thereafter, the physical embodiments of the present invention are provided to enable the reader to understand the various manifestations of the present invention. Finally, a detailed description of the elements is provided in order to enable the reader to make and use the various embodiments of the invention without involving extensive experimentation.

(1) Glossary

Before describing the specific details of the present invention, it is useful to provide a centralized location for various terms used herein and in the claims. A definition has been included for these various terms. However, the definition provided should not be considered limiting to the extent that the terms are known in the art. These definitions are provided to assist in teaching a general understanding of the present invention.

Computer readable media—The term "computer readable media," as used herein, denotes any media storage device that can interface with a computer and transfer data back and forth between the computer and the computer readable media. Some non-limiting examples of computer readable media include: an external computer connected to the system, an interne connection, a Compact Disk (CD), a Digital Versatile Disk/Digital Video Disk (DVD), a floppy disk, a magnetic tape, an interne web camera, a direct satellite link, a video cassette recorder (VCR), a removable hard drive, a digital camera, a video camera, a video cassette, an electronic email, a printer, a scanner, a fax, a solid-state recording media, a modem, a read only memory (ROM), and flash-type memories.

De-Multiplexer—The term "De-Multiplexer," as used herein, is a standard term used in the fields of electronics, telecommunications, signal processing, digital circuits design, and computer networks to denote a process or device that separates or splits a single input signal, that carries multiple individual signals within (such as multiple channels or telephone calls), into multiple output signals, such that the "output signals from the de-multiplexer" correspond to the individual signals carried by the single input signal. The aim of a de-multiplexer is to extract the original signals or channels on a receiver side of a transmission system. Generally, a de-multiplexer is often used on a receiver side of a communication system with a complementary multiplexer on the transmitting side of the communication system.

DEMUX—An acronym for "De-Multiplexer." The term "DEMUX," as used herein, is a standard term used in the fields of electronics, telecommunications, signal processing, digital circuits design, and computer networks to denote a De-multiplexer which separates or splits a single input signal, that carries multiple individual signals within, into multiple output signals, such that the "output signals from the De-multiplexer" correspond to the individual signals carried by the single input signal.

Direct-Broadcast-Service (DBS)—The term "Direct-Broadcast-Service," as used herein, is a standard term used in the field of satellite communications to denote a broadcasting service that delivers television programs over coverage areas, via dedicated broadcasting satellites in geostationary orbits, to small DBS satellite dishes (usually 18 to 24 inches or 45 to 60 cm in diameter) operating in the upper portion of the microwave Ku frequency band. DBS technology is typically used for direct-to-home (DTH) oriented satellite TV services, such as Direct TV® and DISH Network® in the United States of America.

DBS—An acronym for "Direct-Broadcast-Service." The term "DBS," as used herein, is a standard term used in the field of satellite communications to denote a direct-broadcasting-service that delivers television programs over coverage areas, via dedicated broadcasting satellites in geostationary orbits, to small DBS satellite dishes (usually 18 to 24 inches or 45 to 60 cm in diameter) operating in the upper portion of the microwave Ku frequency band. DBS technology is typically used for direct-to-home (DTH) oriented satellite TV services.

Fixed-Satellite-Service (FSS)—The term "Fixed-Satellite-Service," as used herein, is a standard term used in the field of satellite communications to denote a broadcasting service that uses the C frequency band and the lower portions of the Ku frequency band for transmission of broadcast feeds to and from television networks and local affiliate stations, as well as being for transmissions of distance learning by schools and universities, video-conferencing, and to distribute national cable channels to cable television head-ends. Fixed-satellite-service (FSS) operates at lower frequency and lower power than a direct broadcast service (DBS). The fixed-satellite-service requires a much larger dish for reception than DBS, such as 3 to 8 feet in diameter for Ku frequency band transmission and 12 feet in diameter for C frequency band transmission.

FSS—An acronym for "Fixed-Satellite-Service." The term "FSS," as used herein, is a standard term used in the field of satellite communications to denote a fixed-satellite-service that uses the C frequency band and the lower portions of the Ku frequency band for satellite transmission of broadcast feeds to and from television networks and local affiliate stations.

Geostationary Satellite Orbit—The term "Geostationary Satellite Orbit," as used herein, is a standard term used in the field of satellite communications to denote a satellite orbit around the planet Earth with an altitude of approximately 35786 km (22240 miles), with an orbital period equal to approximately 24 hours (average rotation time of the Earth), and with an approximately zero orbital inclination in reference to the equatorial plane of the Earth. To an observer on the ground, a geostationary satellite will appear as a fixed point in the sky.

Geosynchronous Satellite Orbit—The term "Geosynchronous Satellite Orbit," as used herein, is a standard term used in the field of satellite communications to denote a satellite orbit around the planet Earth with an altitude of approximately 35786 km (22240 miles) and with an orbital period equal to approximately 24 hours (average rotation time of the Earth). A geosynchronous satellite has an orbit synchronized with the rotation of the planet Earth and a non-zero orbital inclination in reference to the equatorial plane of the Earth. To an observer on the ground, a geosynchronous satellite will appear to trace an analemma (depicted as a FIG. 8) in the sky.

Input—The term "input," as used herein, is used to denote any device used to receive input from a user or a system. Some non-limiting examples of input devices are: a keyboard, a microphone, a computer mouse, a wireless signal communication, a game engine, and an electronic writing device, wherein the electronic writing device permits a user to write notes and to draw doodles on a pad to be transferred to a computer by use of a special electronic ball point pen.

Instruction means—The term "instruction means" when used as a noun with respect to this invention generally indicates a set of operations to be performed on a computer, and may represent pieces of a whole program or individual, separable, software (or hardware) modules. Non-limiting examples of "means" include computer program code (source or object code) and "hard-coded" electronics. The "means" may be stored in the memory of a computer or on a computer readable medium. In some cases, however, the term "means" refers to a class of device used to perform an operation, and thus the applicant intends to encompass within this language any structure presently existing or developed in the future that performs the same operation.

Multiplexer—The term "Multiplexer," as used herein, is a standard term used in the fields of electronics, telecommunications, signal processing, digital circuits design, and computer networks to denote a process where multiple input signals, such as analog message signals or digital data streams, are combined into one output signal over a shared medium. The aim of a multiplexer is to share an expensive resource, such as a transponder channel or a wire, among multiple input signals. As an example, in telecommunications, several telephone calls (multiple input signals) may be transferred using one wire (single output signal). In contrast, an electronic multiplexer can be considered as a multiple input, single-output switch. The two most basic forms of multiplexing are time-division multiplexing (TDM) and frequency-division multiplexing (FDM), where FDM requires modulation of each signal. Generally, a multiplexer is often used on a transmitting side of a communication system with a complementary de-multiplexer on the receiving side of the communication system.

MUX—An acronym for "Multiplexer." The term "MUX," as used herein, is a standard term used in the fields of electronics, telecommunications, signal processing, digital circuits design, and computer networks to denote a Multiplexer that allows multiple input signals to be combined into one output signal over a shared medium.

On-line—The term "on-line," as used herein, is a standard term used to denote "under the control of a central computer," as in a manufacturing process or an experiment. On-line also means to be connected to a computer or computer network, or to be accessible via a computer or computer network.

Operation of downloading, at the downlink segment, the transformed WFM signals transmitted from the satellite segment—The term "operation of downloading, at the downlink segment, the transformed WFM signals transmitted from the satellite segment," as used herein, is a standard term used to denote the process by which a signal (in this case a transformed WFM signal) is downloaded from the satellite and is received and processed at the downlink segment. The "operation of downloading, at the downlink segment, the transformed WFM signals transmitted from the satellite segment" comprises the operations of:
  receiving, at a user end of downlink segment, the frequency translated WFM signals from the transponders; and
  amplifying the received frequency translated WFM signals from the transponders.

Operation of processing, at the downlink segment, the downloaded transformed WFM signals to a base-band frequency resulting in base-band frequency WFM signals—The term "operation of processing, at the downlink segment, the downloaded transformed WFM signals to a base-band frequency resulting in base-band frequency WFM signals," as used herein, is a standard term used to denote the process by which a signal (in this case a downloaded transformed WFM signal) is frequency down-converted from a satellite amplified frequency translated WFM signal to a common IF or base-band frequency, resulting in base-band frequency WFM signal.

Operation of transforming a WFM signal to satellite frequency band—The term "operation of transforming a WFM signal to satellite frequency band," as used herein, is a standard term used to denote the process by which a signal (in this case a WFM signal) is up-converted, at the uplink segment, into a signal in the satellite frequency band. The operation of transforming the WFM signals to a satellite frequency band comprises the operations of:
  frequency up-converting the output wavefront multiplexed signals to distinct frequency carriers within frequency bands for satellite communications;
  amplifying frequency up-converted wavefront signals; and
  frequency multiplexing amplified wavefront signals by utilizing an output multiplexer at the satellite frequency band.

Operation of transmitting, at the satellite segment, the transformed WFM signals to a downlink segment—The term "operation of transmitting, at the satellite segment, the transformed WFM signals to a downlink segment," as used herein, is a standard term used to denote the process by which a signal (in this case a transformed WFM signal) is transmitted through the satellite segment towards a downlink segment. The "operation of transmitting, at the satellite segment, the transformed WFM signals to a downlink segment" comprises the operations of:
  receiving in a satellite the transformed wavefront multiplexed signals;
  translating the carrier frequencies of the transformed wavefront multiplexed signals; and
  amplifying and transmitting the frequency translated wavefront multiplexed signals through the satellite transponders toward the user end of downlink segments, wherein each frequency translated wavefront multiplexed signal is amplified and transmitted through its own individual and independent transponder, whereby all designated transponders in the satellite are being utilized to transmit frequency translated wavefront multiplexed signals, thereby utilizing all available space assets of the satellite.

Real-time—The term "real-time," as used herein, is a standard term used to relate to computer systems that update information, or perform a task, at the same rate as they receive data.

Recording media—The term "recording media," as used herein, denotes any media used to store information about an object or a scene. Some non-limiting examples of recording media are: a video film, a video recording tape, an audio recording tape, an audio cassette, a video cassette, a video home system (VHS) tape, an audio track, a Compact Disk (CD), a Digital Versatile Disk/Digital Video Disk (DVD), a floppy disk, a removable hard drive, a digital camera, a solid-state recording media, a printed picture, a scanned document, a magnetic tape, and a faxed document.

User—The term "user," as used herein, denotes a person utilizing the method for automatically extracting geospatial features from multi-spectral imagery.

Wavefront-Multiplexer—The term "Wavefront-Multiplexer," as used herein, is not a standard term used in the fields of telecommunications, electronics, signal processing, digital circuits design, or computer networks. Instead, the term Wavefront-Multiplexer is used to denote a specialized signal processing transform based on a variation from the standard multiplexer known by one skilled in the art, whereas a multiplexer combines multiple inputs into a single output, the Wavefront-Multiplexer allows multiple inputs to be combined into multiple outputs, such that each output is comprised of a unique linear combination of all the inputs and such that the outputs from the Wavefront-Multiplexer are orthogonal to one another. The Wavefront-Multiplexer is a multiple-input/multiple-output (MIMO) transform that has at least as many outputs as there exist inputs connected to the wavefront-multiplexer. The Wavefront-Multiplexer performs an orthogonal functional transformation from a spatial-domain representation of the inputs to a wavefront-domain representation of the inputs, wherein a necessary and sufficient condition of the Wavefront-Multiplexer transform is that the Wavefront-Multiplexer transform has a realizable unique inverse.

WFM—An acronym for "Wavefront-Multiplexer." The term "WFM," as used herein, is a non-standard term used to denote a wavefront-multiplexer, wherein the Wavefront-Multiplexer is a specialized signal processing transform based on a variation from the standard multiplexer, whereas a multiplexer combines multiple inputs into a single output, the Wavefront-Multiplexer allows multiple inputs to be combined into multiple outputs, such that each output is comprised of a unique linear combination of all the inputs and such that the outputs from the Wavefront-Multiplexer are orthogonal to one another.

Wavefront-De-Multiplexer—The term "Wavefront-De-Multiplexer," as used herein, is not a standard term used in the fields of telecommunications, electronics, signal processing, digital circuits design, or computer networks. Instead, the term wavefront-de-multiplexer is used to denote a specialized signal processing transform based on a variation from the standard de-multiplexer known by one skilled in the art, whereas a de-multiplexer separates or splits a single input signal, that carries multiple individual signals within, into multiple output signals corresponding to the individual signals carried by the single input signal, the wavefront-de-multiplexer separates multiple inputs, that each carry a unique mixture of individual signals, into multiple outputs, such that each output corresponds to one of the individual signals carried by the multiple inputs. The wavefront-de-multiplexer is a multiple-input/multiple-output (MIMO) transform that performs an orthogonal functional transformation from a wavefront-domain representation of signals to a spatial-domain representation of signals. The wavefront-de-multiplexer is a complementary transform to the wavefront-multiplexer, wherein the wavefront-de-multiplexer is often used on a receiver side of a communication system with a complementary Wavefront-Multiplexer on the transmitting side of the communication system. The aim of a wavefront-de-multiplexer is to extract the original transmitted signals on a receiver side of a transmission system.

WFDM—An acronym for "Wavefront-De-Multiplexer." The term "WFDM," as used herein, is a non-standard term used to denote a Wavefront-De-Multiplexer, wherein the wavefront-de-multiplexer is a specialized signal processing transform based on a variation from the standard de-multiplexer, whereas a de-multiplexer separates or splits a single input signal, that carries multiple individual signals within, into multiple output signals corresponding to the individual signals carried by the single input signal, the wavefront-de-multiplexer separates multiple inputs, that each carry a unique mixture of individual signals, into multiple outputs, such that each output corresponds to one of the individual signals carried by the multiple inputs.

(2) Overview

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps and operations are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, data, video frames, audio signals, elements, files, digital signal streams, and coefficients.

It is to be understood, that all of these, and similar terms, are to be associated with the appropriate physical quantities, and are merely convenient labels applied to these quantities. Unless specifically stated otherwise as apparent from the following discussions, it is appreciated that throughout the present disclosure, discussions utilizing terms such as "acquiring," "amplifying," "augmenting," "calculating," "communicating," "controlling," "converting," "determining," "displaying" "downloading," "extracting," "inputting," "interacting," "interfacing," "matching," "modeling," "obtaining," "outputting," "performing," "processing," "receiving," "recognizing," "recovering," "separating," "tracking," "transforming," "transmitting," "translating," or "uploading," refer to the action and processes of a computer system, or similar electronic device that manipulates and transforms data represented as physical (electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

(3) Physical Embodiments of the Present Invention

The present invention has two principal "physical" embodiments. The first is a system for dynamically combining power from a plurality of propagation channels (transponders) in order to improve power levels of transmitted signals. In doing so, the dynamic power allocation is implemented through the transmitter segment (ground end of uplink segment) without affecting the receiver segment (user end of downlink segment) and the propagation segment (space segment), and without modifying configuration of propagation apparatus and propagation channels (satellite and transponders in the space segment). Such a system is typically but not limited to a computer system operating software in the form of a "hard coded" instruction set.

This system may also be specially constructed, as an application-specific integrated circuit (ASIC), or as a readily reconfigurable device such as a field-programmable gate array (FPGA).

The second physical embodiment is a method, typically in the form of software, operated using a data processing system (computer).

A block diagram depicting the components of a computer system used in the present invention is provided in FIG. 1. The data processing system 100 comprises an input 102 for receiving a plurality of input signals comprising digital signals, analog signals, mixed analog and digital signals, and a plurality of digital signal streams. The input 102 may also be configured for receiving a user's input or an operator's input from another input device such as a microphone, keyboard, drawing pads, or a mouse, in order for the operator (user) to dynamically allocate equivalent transponder powers according to continuously changing market demands by dynamically including change of relative input powers into ratios of mixtures of the input digital signal streams. Note that the input 102 may include multiple "ports" for receiving data and user input, and may also be configured to receive information from remote databases using wired or wireless connections. The output 104 is connected with the processor for providing output to the user (operator), on a video display but also possibly through audio or kinesthetic signals (e.g., through pinching, vibrations, heat, etc.). Output may also be provided to other devices or other programs, e.g. to other software modules, for use therein, possibly serving as a wired or wireless gateway to external databases or other processing devices. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor. Typical manifestations of the data processing system 100 may be incorporated into a ground end of an uplink segment, a program aggregation facility for a DBS service, a user end uplink segment, vehicles, cellular phones, portable digital assistants, and computers. It should be recognized by those skilled in the art that multiple processors may also be used and that the operations of the invention can be distributed across them.

(4) Detailed Description of the Elements

I) Embodiment of the Invention for a Dynamic Communication System

Figure 2:
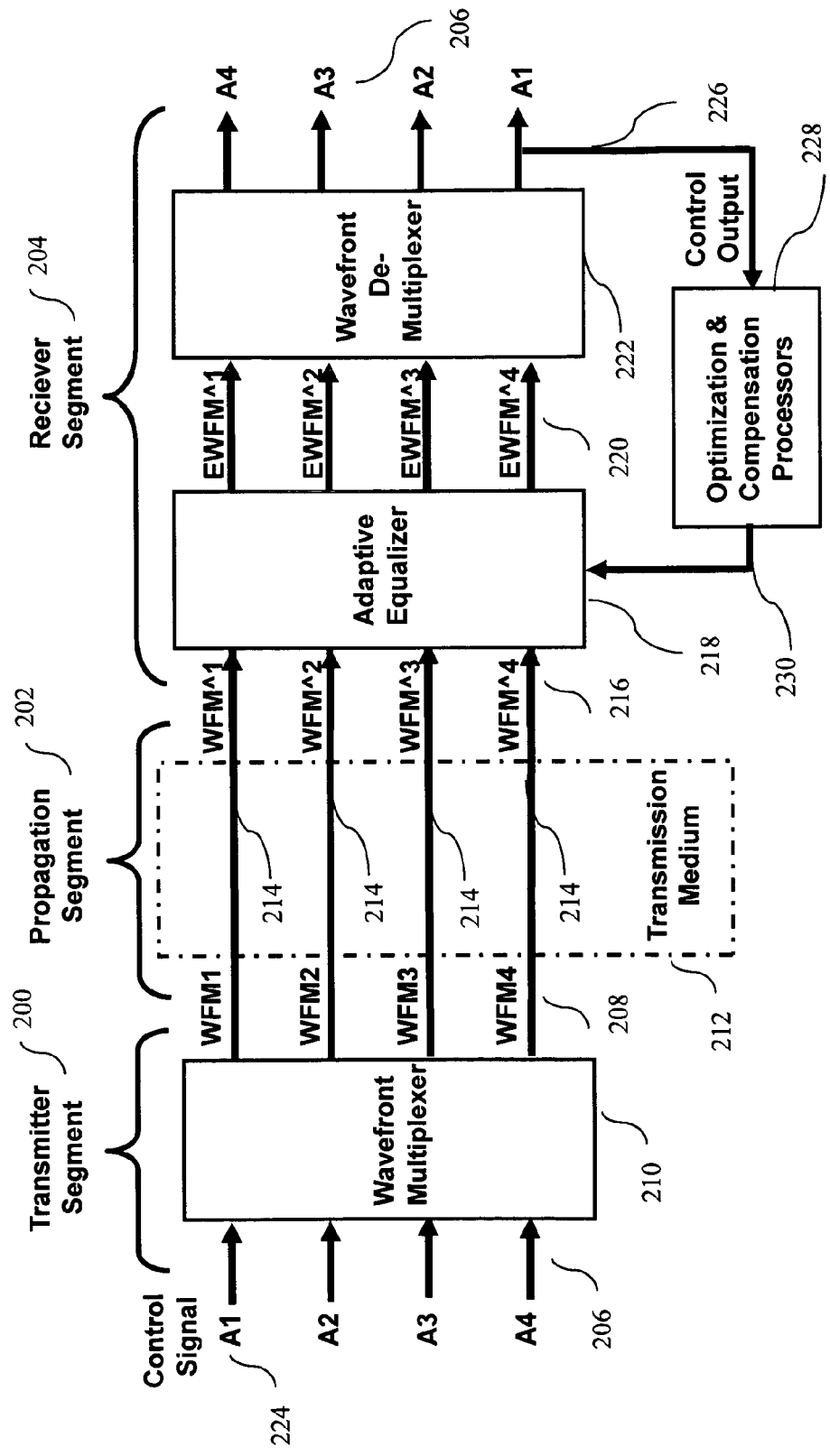
FIG. 2 is an illustrative block diagram depicting an embodiment of the invention.

A detailed description of an embodiment of the present invention is presented schematically in a diagram in FIG. 2. FIG. 2 illustrates a dynamic communication system suitable for dynamically combining power from a plurality of propagation channels through a transmitter segment 200 without affecting the receiver segment 204 and propagation segment 202. In this detailed embodiment, the blocks in the diagram represent the functionality of the system of the present invention. At the start, the system inputs (receives) a plurality of signals 206 to be transmitted, where the terms A1, A2, A3, and A4 in FIG. 2 denote a non-limiting example of four input signals 206 to be transmitted by the dynamic communication system. Next, the system transforms the input signals 206 into wavefront multiplexed signals 208 (WFM signals) by performing a Wavefront-Multiplexing transform 210 (WFM transform), where the terms WFM1, WFM2, WFM3, and WFM4 in FIG. 2 denote the four wavefront multiplexed signals 208 generated by the Wavefront Multiplexing transform 210. Then, the system transmits the WFM signals 208 over a transmission medium 212 through propagation channels 214, wherein there exist at least as many propagation channels 214 as there exist WFM signals 208, and where each WFM signal 208 is transmitted over its own propagation channel 214. In this embodiment, the propagation segment 202 comprises a transmission medium 212 and a plurality of propagation channels 214, along with a propagation apparatus (such as a satellite). Some non-limiting and non-exhaustive examples of a propagation medium comprise air, water, outer space, fiber optical lines, sound waves, radio waves, sonar, wires, light, and radar.

Next, the system receives, at the receiver segment 204, the transmitted WFM signals 216 from the propagation channels 214, where the terms WFM^1, WFM^2, WFM^3, and WFM^4 in FIG. 2 denote the four transmitted WFM signals 216 received from the propagation channels. These transmitted WFM signals 216 (WFM^1, WFM^2, WFM^3, and WFM^4) have been modified during the transmission in the propagation segment 204 and have unbalanced amplitudes, unbalanced phases, and/or unbalanced time-delays with respect to the initial WFM signals 208 (WFM1, WFM2, WFM3, and WFM4) originally transmitted, in addition to having dynamic differential propagation effects due to the transmission medium. Therefore, the system performs, at the receiver segment 204, adaptive equalization 218 on the received WFM signals 216 (WFM^1, WFM^2, WFM^3, and WFM^4) in order to account for the propagation channel effects comprising dynamic differential propagation effects due to the transmission medium 212 and static differential propagation effects comprising unbalanced amplitudes, unbalanced phases, and/or unbalanced time-delays between the received WFM signals 216 (WFM^1, WFM^2, WFM^3, and WFM^4) and the WFM signals 208 (WFM1, WFM2, WFM3, and WFM4) outputted by the WFM transform 210. During the adaptive equalization process, the adaptive equalizer 218 generates equalized WFM signals 220, where the terms EWFM^1, EWFM^2, EWFM^3, and EWFM^4 in FIG. 2 denote the equalized WFM signals 220 generated by the adaptive equalizer 218.

Once the propagation channel effects from the propagation segment have been reversed by the adaptive equalizer 218, the system separates the equalized WFM signals 220 into individual spatial-domain signals 206 by performing a Wavefront-De-Multiplexing transform 222 (WFDM transform), where the terms A1, A2, A3, and A4 in FIG. 2 denote the individual spatial-domain signals 206 recuperated by the receiver segment 204, such that the recuperated spatial domain signals correspond to the original spatial domain input signals 206 initially transmitted by the transmitter segment 200. Next, the system outputs the individual spatial-domain signals 206.

During the adaptive equalization process 218 performed at the receiver segment 204, this embodiment of the invention connects a control signal 224 to a WFM input port denoted by the term A1. This WFM input port connected to a control signal 224 at the transmitter segment 200 has a corresponding WFDM controlled output port 226 at the receiver segment 204. The WFDM controlled output port 226 is used as a diagnostic port where a cost function is used to measure the difference between the controlled input port 224 and its corresponding diagnostic port 226. Then, the system uses an optimization processor and several compensation processors 228 (such as amplitude, phase, and time-delay compensation processors) to generate compensation signals 230 that compensate for the propagation channel effects from the propagation segment 202 and which are used to adjust the adaptive equalizer 218 in order to minimize the cost function. Adaptive equalization is reached when the cost function is minimal and the cost function can no longer be reduced any further.

An embodiment of the invention utilizes two separated areas of technology to equivalently achieve power combining and providing better throughput and availability of broadcasted signals to DBS ground subscribers. These two technological areas are: wave-front multiplexing and adaptive equalization, and compensation among multiple signal paths.

II) Wavefront Multiplexing

A detailed description of Wavefront-Multiplexing is presented. A Wavefront-Multiplexer or Wavefront Multiplexing is a specialized signal processing transform based on a variation from the standard multiplexer known by one skilled in the art. Whereas a standard multiplexer combines multiple inputs into a single output, the Wavefront-Multiplexer allows multiple inputs to be combined into multiple outputs, such that each output is comprised of a unique linear combination of all the inputs and such that the outputs from the Wavefront-Multiplexer are orthogonal to one another. Therefore, the Wavefront-Multiplexer (WFM) is a multiple-input/multiple-output (MIMO) transform that has at least as many outputs as there exist inputs connected to the wavefront-multiplexer. The Wavefront-Multiplexer performs an orthogonal functional transformation from a spatial-domain representation of the inputs (such as the terms A1, A2, A3, and A4 in FIG. 2 denoted by element 206) to a wavefront-domain representation of the inputs (such as the terms WFM1, WFM2, WFM3, and WFM4 in FIG. 2 denoted by element 208). A necessary and sufficient condition of the Wavefront-Multiplexer transform is that the Wavefront-Multiplexer transform has a realizable unique inverse.

A complementary transform to the Wavefront-Multiplexer is the Wavefront-De-Multiplexer. The Wavefront-De-Multiplexer is often used on a receiver side of a communication system with a complementary Wavefront-Multiplexer on the transmitting side of the communication system. The aim of a Wavefront-De-Multiplexer is to extract the original transmitted signals on a receiver side of a transmission system. Generally, Wavefront-De-Multiplexer is used to denote a specialized signal processing transform based on a variation from the standard De-Multiplexer known by one skilled in the art. Whereas a De-Multiplexer separates or splits a single input signal that carries multiple individual signals within into multiple output signals corresponding to the individual signals carried by the single input signal, the Wavefront-De-Multiplexer separates multiple inputs, that each carry a unique mixture of individual signals, into multiple outputs, such that each output corresponds to one of the individual signals carried by the multiple inputs. The Wavefront-De-Multiplexer is a multiple-input/multiple-output (MIMO) transform that performs an orthogonal functional transformation from a wavefront-domain representation of signals to a spatial-domain representation of signals.

Figure 3:
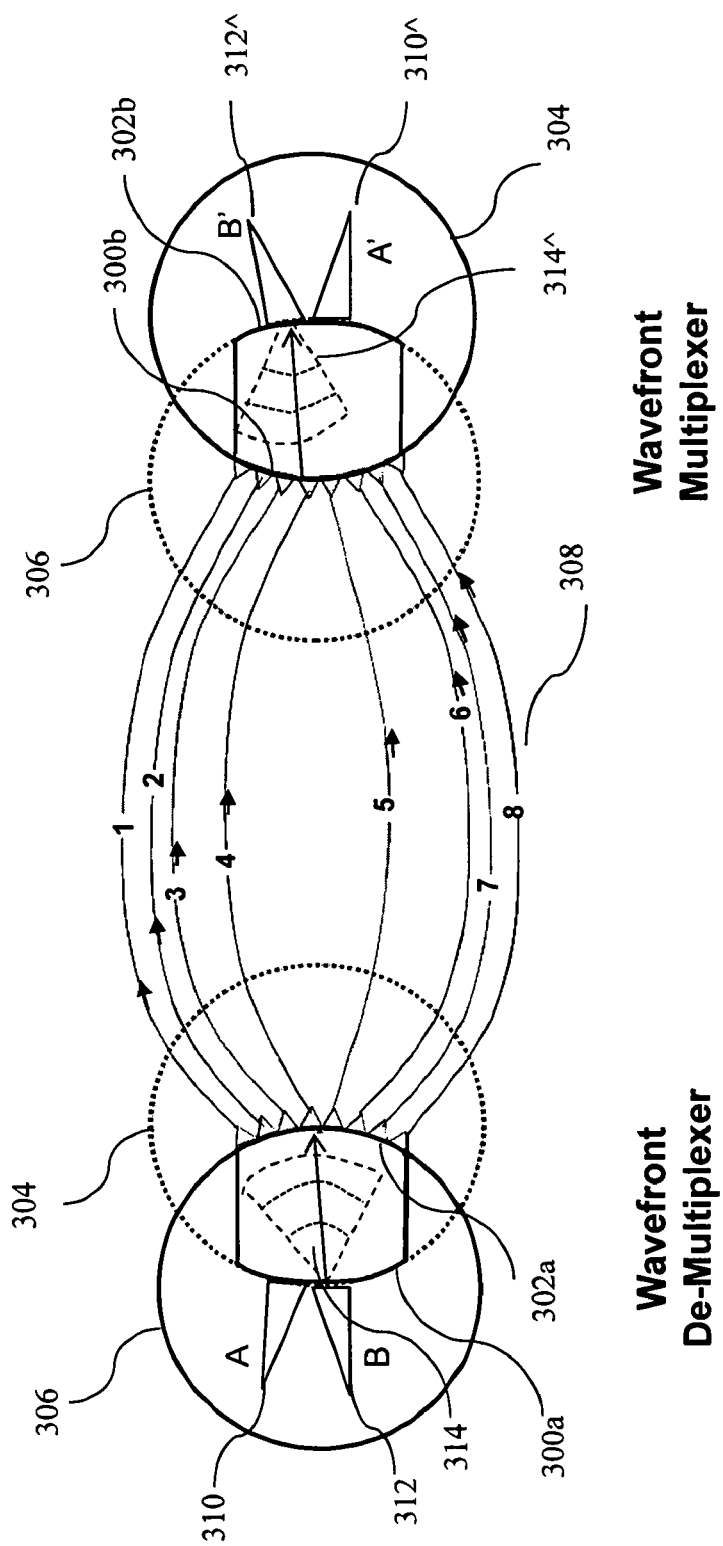
FIG. 3 is an image illustrating the functionality of the Wavefront Multiplexing transform.

For illustrative purposes, the concepts of Wavefront Multiplexing and Wavefront De-Multiplexing are graphically illustrated in FIG. 3. Generally, the operations of the Wavefront-Multiplexer and De-Multiplexer can be graphically visualized by the use of two dimensional lenses, where each lens consists of two surfaces that are constructed as follows: (a) the left surface of a lens (left edge of each lens 300a and 300b) is a segment of a circle 304 centered at the middle of the right surface of the lens (elements 302a and 302b) with a radius of R, and (b) the right surface of a lens (right edge of each lens 302a and 302b) is a segment of a circle 306 centered at the middle of the left surface (elements 300a and 300b) with a radius of R. The lens on the right of FIG. 3 (formed by the lens surfaces 300b and 302b) is the mechanisms for Wavefront Multiplexing, while the lens on the left (formed by the lens surfaces 300a and 302a) is the mechanisms for Wavefront De-Multiplexing.

In order to graphically visualize the functionality of these wavefront transforms, the two lenses representing the Wavefront Multiplexing (WFM)/De-Multiplexing (WFDM) pair are connected by eight identical optical fibers 308 that act as propagation channels. On one end, the eight optical fibers are connected evenly distributed on the circular surface of the right edge 302a of the left lens corresponding to the WFDM lens (elements 300a and 302a). On the other end, the eight optical fibers are connected evenly distributed on the circular surface of the left edge 300b of the right lens corresponding to the WFM lens (elements 300b and 302b).

The functionality of the WFDM is illustrated as follows: Two signal sources denoted by 310 (source A) and 312 (source B) are connected to the inputs of the right lens 300a of the WFDM, where the source A 310 is above the center of the circular surface of the opposite edge of the lens 302a and source B 312 is below the center of the circular surface of the opposite edge of the lens 302a. Source B 312, as shown, generates a circular wavefront centered at the B port 314 (the circular wavefront 314 is similar to concentric circles or waves generated by throwing a pebble into a peaceful lake). The circular wavefront 314 originated by the source B 312 is picked up by the eight optical fibers 308, which are connected and evenly distributed on the circular surface of the right edge 302a of the left lens (WFDM). However, the optical fibers do not pick up the circular wavefront at the same time, but each optical fiber receives the wavefront in a sequential manner (after some time delay). As such, the input for optical fiber number 8 senses the wavefront first while the input for the optical fiber number 1 receives the wavefront the last. In a similar manner, the circular wavefronts generated by source A 310 will be sensed by the optical fibers on a reverse sequence order, such that fiber number 1 will sense the wavefront generated from source A 310 first, while fiber number 8 will be the last fiber to sense the wavefront from source A 310. As a result, there are two different and simultaneous wavefronts propagating through the eight fibers at the same time but at different time delays and off phase from each other, one from source A 310 and the other from source B 312. Therefore, the wavefront 314 generated by source B 312 is traveling through each one of the eight fibers at different moments in time along with the wavefront generated by source A 310, such that both wavefronts are intermixed with each other through time delays and phase delays within each optical fiber, and such that there are eight different representations of each wavefront generated by a source traveling through the fibers at any point in time (similar in nature to a standard De-Multiplexer).

The functionality of the WFM, denoted by the lens on the right (300b and 302b) in FIG. 3, is illustrated as follows: The lens on the right in FIG. 3 is designed to have eight optical fiber inputs 308 connected to the left edge 300b of the right lens, and two outputs 310^ and 312^ connected to the right circular surface 302b of the right lens. The two-dimensional lens (300b and 302b) is architected to focus two unique circular wavefronts received from the left surface to two unique "sinks" 310^ and 312^ (denoted by elements A' and B') on the right surface 302B. One of the incoming waveforms will be focused to the sink port A' 310^ forming a peak at sink A' 310^ with a null at sink B' 312^, while the other incoming wavefront 314 will be focused to the sink port B' 312^ forming a peak at sink B' 312^ with a null at sink A' 310^.

When the fibers in the bundle are identical, with equal amplitude attenuations and equal propagation delays through all the eight fibers (i.e., no propagation channel effects), the source A 310 will be transported to sink A' 310^ while source B 312 will be transported to sink B' 312^. However, usually the fibers in the bundle will not be identical in amplitude attenuations and propagation delays through out all eight fibers due to environment changes or aging, thus creating disparate propagation effects. As a result, the source A 310 will not only be transported to sink A' 310^ but also with leakage into sink B' 312^. In a similar manner, source B 312 will not only be delivered to the intended destination of sink B' 312^, but also to the unintended destination of sink A' 310^.

Therefore, in order to be able to recuperate the original signals being transmitted over the optical fibers (propagation channels), adaptive channel equalization must be performed prior to separating the intermixed wavefront multiplexed signals in the fibers (propagation channels) in order to eliminate the propagation channel effects from the optical fibers and to avoid leakage from one signal into the sink of the other signal.

Reversing the flow of the signals in FIG. 3 illustrates the functionality of the WFM transformation, where the functionality of the WFM is represented by the combination of lens edges 300b and 302b. The reverse flow of signals traveling from right to left (through the optical fibers 308) is generated by two sources A' 310^ and B' 312^ on the right side of FIG. 3. As a result of WFM as illustrated in FIG. 3, each optical fiber 308 (or propagation channel) carries the two input signals, generated by source A' 310^ and source B' 312^ respectively, in a unique linear combination. The eight optical fibers 308 carry eight intermixed wavefront multiplexed signal combinations of the two input signals, where the intermixed WFM signal combinations correspond to unique and orthogonal linear combinations of the two input signals generated by the two sources A' 310^ and B' 312^. Next, the propagation channel effects among the different optical fibers must be dynamically equalized (by adaptive equalization) at the left side (receiver segment) using cost minimization algorithms prior to separating the intermixed WFM signals by using the WFDM, where the functionality of the WFDM is represented by the combination of edges of the left lens 300a and 302a. Once the propagation channel effects from the optical fibers are eliminated, the two original signals from the right side sources A' 310^ and B' 312^ are then transformed via WFDM into the two recuperated input signals.

Mathematically, the Wavefront Multiplexing and De-Multiplexer operation is an orthogonal functional manipulation or transformation, and it may be implemented many ways. The transformation is not in between the time and frequency domains, but is an orthogonal transformation between the spatial domain and the wave-front domain.

The Wavefront Multiplexing transformation is expressed by a linear equation as follows:

$$Y = \underline{WFM} * X, \quad (1)$$

where
X denotes the input vectors,
Y denotes the output vector, and
$\underline{WFM}$ denotes the functional transformation matrix.

In addition, the wavefront transformation features the characteristic that the WFT is orthogonal to itself, such that $$\underline{WFM}^* \underline{WFM} = I \quad (2)$$

A non-limiting example of an orthogonal transformation matrix used to implement an embodiment of the Wavefront Multiplexing transform is presented below. This non-limiting example of a WFM transform is implemented by an analogue 4-to-4 Butler Matrix (BM) at the Ku band. Two examples of the vector weightings 400a, 400b, by phase rotation only, are illustrated in FIG. 4, where the WFM operation, $\underline{WFM}$, is a 4×4 matrix, with 4 row matrices as follows:

[W11, W12, W13, W14]=[exp(jΦ11), exp(jΦ12), exp(jΦ13), exp(jΦ14)],
[W21, W22, W23, W24]=[exp(jΦ21), exp(jΦ22), exp(jΦ23), exp(jΦ24)],
[W31, W32, W33, W34]=[exp(jΦ31), exp(jΦ32), exp(jΦ33), exp(jΦ34)],
[W41, W42, W43, W44]=[exp(jΦ41), exp(jΦ42), exp(jΦ43), exp(jΦ44)], Since the WFM operation, WFM, is a linear operation, it may be implemented as 8×2-to-8×2 or 2×2-to-2×2 BMs at baseband. In addition to implementing a WFM transform using a Butler Matrix, a plurality of specific WFM matrices can be generated using Fourier transform pairs or Hartley transform pairs when working in the digital domain.

III) Embodiment of the Invention for Satellite Communications

Another embodiment of the invention (using WFM techniques) can be used for satellite communications, including DBS applications, in order to allow N individual signal streams from a given uplink ground station (transmitter segment) to go through M independent transponders (or propagation channels) on a satellite (propagation apparatus). Then, the receiving downlink ground stations or subscriber terminals (receiver segment) can recover the individual signal streams faithfully by using Wavefront De-Multiplexing (WFDM) and additional signal processing processes, such adaptive equalization to remove propagation channel effects, under the constraint that there exist at least as many number of transponders, M, as there exist individual signal streams, N, being transmitted. One of the many possible applications of this WFM technique is the effective power combining, or Equivalent Isotropic Radiated Power (EIRP) combining, from various transponders in the same satellite or from various transponders in different satellites. The power combining corresponds to a dynamic power allocation implemented through the uplink station (transmitter segment) without affecting the receiving ground stations (receiver segment) and without affecting the satellite configuration (propagation segment).

As a result of WFM as previously illustrated in FIG. 3, each transponder (or channel) carries all the signal streams in a unique linear combination. The M transponders correspond to M different and orthogonal linear combinations of the N signals streams. Then, the propagation channel effects among the different transponders must be dynamically equalized (by adaptive equalization) at the received ground station (receiver segment) using cost minimization algorithms. The M equalized received channels are then transformed via WFDM into the N recuperated signal streams.

Figure 5:
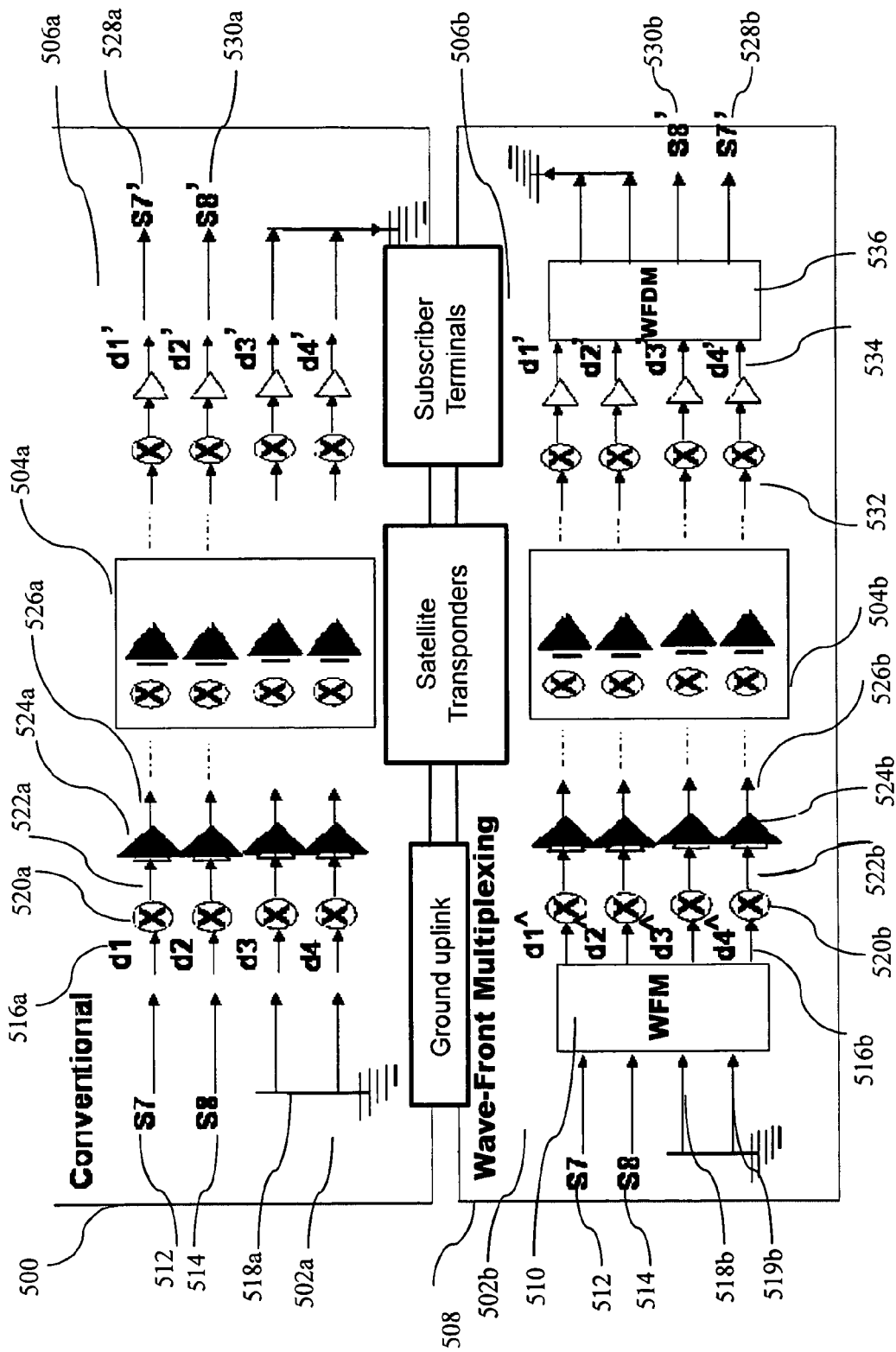
FIG. 5 is an illustrative block diagram contrasting a conventional DBS satellite system with an embodiment of the invention.

FIG. 5 provides schematically in a functional block diagram an embodiment of the invention for a dynamic satellite communication system suitable for dynamically combining power from a plurality of satellite transponders in order to improve the power levels of the transmitted signals. In this detailed embodiment, the blocks in the diagram represent the functionality of the system of the present invention. Furthermore, the schematics illustrated in FIG. 5 simply reflect an example of a non-limiting and non-exhaustive combination of input signals, satellites, satellite transponders, and control signals that may be used with an embodiment of this invention. These signals' examples (illustrated in FIG. 5) are provided in order to assist with the description of the functionality of this embodiment of the invention and these signals' examples represent only a non-limiting illustration of one of many combinations of the input signals, satellites, satellite transponders, and control signals that may be used with the present invention.

FIG. 5 depicts two simplified functional block diagrams of two satellite based direct broadcasting systems (DBS). The top panel 500 depicts a conventional DBS system as generally used in the art of satellite communication, including a transmitter segment comprising a ground uplink segment 502a, a propagation segment comprising one satellite with a plurality of satellite transponders 504a, and a receiver segment comprising a DBS subscriber terminal 506a. The bottom panel 508 depicts an embodiment of the present invention for a dynamic satellite DBS communication system using a WFM transform 510 in the ground uplink segment 502b of the dynamic satellite DBS system. Both of these DBS systems, the conventional DBS system 500 and the WFM DBS system 508, comprise: a transmitter segment comprising an uplink ground station, 502a and 502b, illustrated on the left side of FIG. 5; a propagation segment comprising one satellite with four satellite transponders available for transmitting signals, 504a and 504b, illustrated on the middle of FIG. 5; and a receiver segment comprising a least one DBS subscriber terminal, 506a and 506b, illustrated on the right side of FIG. 5.

III-i) Conventional DBS Satellite System

In this particular conventional DBS system 500, there are four satellite transponders 504a available to transmit signals via a satellite. As such, the ground uplink segment 502a is capable of transmitting four input signals 516a (denoted by the terms d1, d2, d3, and d4) simultaneously to the four available satellite transponders. However, in this particular example, there are only two input streams of digital signals, represented by term S7 (denoted by element 512) and by term S8 (denoted by element 514), to be broadcasted via the DBS system 500 to various users 506a. Therefore, two of the inputs 516a of the ground uplink segment (referring to terms d3 and d4) are empty (not connected to input signals) or connected to ground signals 518a or zero value signals (for illustration purposes). Additionally, the other two inputs 516a of the ground uplink segment (referring to terms d1 and d2) are connected to the two input signal streams being broadcasted, where input signal stream 512 (term S7) is connected to uplink segment input d1 and input signal stream 514 (term S8) is connected to uplink segment input d2, respectively.

The two input digital streams, 512 and 514, at the uplink station 502a, are transformed to a satellite frequency band by performing the operations of: frequency up-converting 520a the input digital streams, 512 and 514, to two different carrier frequencies within the Ku satellite frequency band; and amplifying and frequency multiplexing 524a the two frequency up-converted input signals 522a by utilizing an output multiplexer at the Ku satellite frequency band. Next, the two transformed Ku band signals 526a are uploaded to the Ku broadcasting satellite via an uplink ground antenna in an uploading facility.

On the satellite, the received Ku band signals 526a go through two separated satellite transponders 504a, individually and independently, before they are ready for broadcasting to various subscriber terminals 506a. The current conventional DBS satellite systems, such as 500, only need two of the available satellite transponders to broadcast the two input digital streams, 512 and 514, and thus under utilize the rest of the available space assets. Therefore, the conventional DBS satellite system 500 only occupies 50% of the available space assets and 50% of the space assets are wasted (referring to the two unused satellite transponders that are available for broadcasting but that are not being utilized during the broadcast by the current conventional DBS satellite systems).

At the subscriber terminals 506a, the proper transponder channels are selected, the desired signals are amplified, filtered, synchronized and de-modulated to recover the intended digital data streams 528a and 530a (denoted by terms S7' and S8', respectively) for further processing prior to providing the processed signals to TV displays.

III-ii) Embodiment of Invention for a Dynamic DBS Satellite System Using WFM Transformation In contrast with the current conventional DBS satellite systems, this embodiment of the invention for a dynamic DBS satellite system, in the bottom panel 508 of FIG. 5, utilizes 100% of the space assets available for transmission. That is, the wavefront multiplexed DBS system transmits both input signal streams, 512 and 514, through all the available satellite transponders 504b, such that all four satellite transponders are used to broadcast the input signal streams.

Similarly to the conventional DBS satellite system 500, this WFM DBS satellite system 508 has four satellite transponders 504b available to transmit signals via a satellite. As such, the ground uplink segment 502b is capable of transmitting four input signals 516b (denoted by the terms d1^, d2^, d3^, and d4^) simultaneously to the four available satellite transponders. Equally to the conventional DBS satellite system, there are only two input streams of digital signals at the ground uplink segment 502b, represented by term S7 (denoted by element 512) and by term S8 (denoted by element 514), to be broadcasted via the WFM DBS satellite system 508 to various subscriber terminals 506b (users or receiver segments). Therefore, two of the inputs, 518b and 519b, to the WFM transform 510 at the ground uplink segment 502b of the invention, are empty (not connected to input signals) or connected to ground signals or zero value signals (for illustration purposes), and the other two inputs of the WFM transform 510 are connected to the two input signal streams being broadcasted, 512 (term S7) and 514 (term S8), respectively.

In contrast with current DBS satellite systems, this embodiment of the invention transforms the two input digital streams, 512 and 514, at the uplink station 502b, into four simultaneous WFM digital streams 516b (denoted by terms d1^, d2^, d3^, and d4^) by performing wavefront multiplexing, prior to frequency up-converting the input signals to four different carrier frequencies in the Ku frequency band. Next, the four WFM digital streams 516b (denoted by terms d1^, d2^, d3^, and d4^), at the uplink station 502b, are transformed to a satellite frequency band by performing the operations of: frequency up-converting 520b the four WFM digital streams 516b, to four different carrier frequencies within the Ku satellite frequency band; and amplifying and frequency multiplexing 524b the four frequency up-converted WFM signals 522a by utilizing an output multiplexer at the Ku satellite frequency band. Next, the four transformed Ku band WFM signals 526b are uploaded to the Ku broadcasting satellite via an uplink ground antenna in an uploading facility.

In this embodiment, the wavefront multiplexer (WFM) can be implemented at digital base-band in digital format, or by analogue devices such as a "Butler matrix." Each of the four outputs 516b from the WFM (denoted by terms d1^, d2^, d3^, and d4ˆ), is a linear combination of both input signals 512 and 514, and each WFM output features a different combination of the input signals than the combinations stored on the other WFM outputs. Furthermore, the four WFM outputs are orthogonal to one another.

On the satellite, the received Ku band WFM signals 526b go through the four separated satellite transponders 504b, individually and independently, before they are ready for broadcasting to various subscriber terminals 506b. The WFM DBS satellite system 508 uses all of the available satellite transponders (uses all four transponders) to broadcast the two input digital streams, 512 and 514 and, therefore, utilize 100% of the available space assets. This is to be contrasted with the conventional DBS satellite system 500 which only occupies 50% of the available space assets (only uses two transponders for transmission).

At the subscriber terminals 506b, the four received wave-front multiplexed signals 532 at the four separated carrier frequencies are amplified before being frequency down converted to a common IF or base-band. Next, the four down converted signals 534 are processed through a 4-to-4 wave-front de-multiplexer (WFDM) 536 to recover the desired signals, which are amplified, filtered, synchronized and de-modulated to restore the intended digital data streams 528b and 530b (denoted by terms S7' and S8', respectively) for further processing prior to providing the processed signals to TV displays.

In order to restore the original digital input data streams 512 and 514 (denoted by terms S7 and S8), the amplitude, time-delays, and the phase-delays of the WFM transmitted signals 516b must be kept constant among the four paths connecting the four outputs of the WFM 516b at the upload station 502b and the four inputs 534 of the WFDM 536 of a subscriber's terminal 506b. This constraint must be included in any embodiment of the present invention since this is a necessary and sufficient condition to make the WFM DBS satellite system work.

Figure 6:
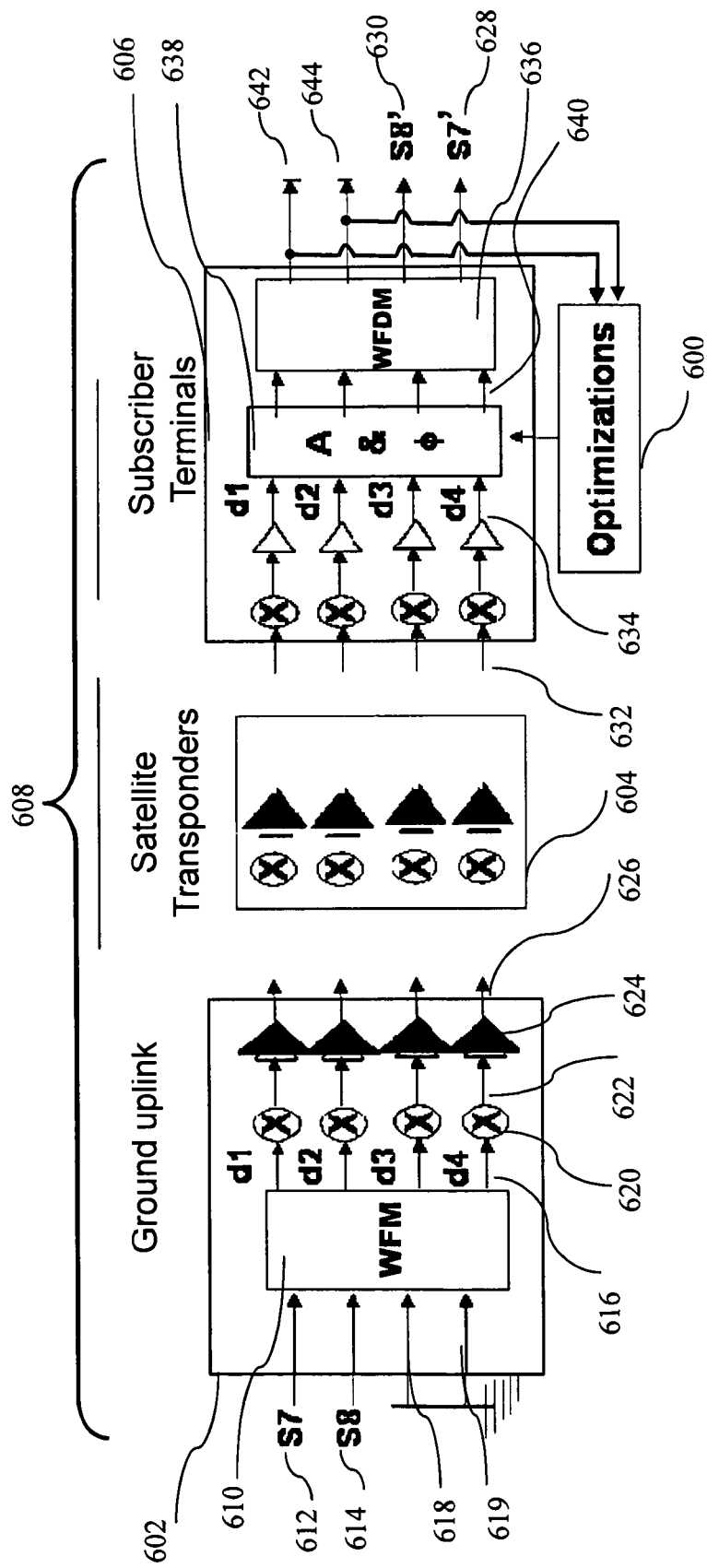
FIG. 6 is an illustrative block diagram depicting an embodiment of the invention comprising adaptive equalization.

Furthermore, this embodiment of the invention utilizes the information derived from the WFDM at a user or subscriber's terminal together with a unique optimization processes to adaptively equalize the four paths individually (between WFM signals 516b and WFDM input signals 534), at each of the subscriber's terminals. The adaptive equalization compensates for path length of phase, time, and amplitude differences among various transponders and propagation effects. The channel compensations are two folds: compensation for static difference of unbalanced amplitudes, unbalanced phases, and unbalanced time-delays among the four transponders, and static propagation effects due to the transmission medium; and compensation for dynamic differential propagation effects due to the transmission medium, such as rain precipitation among the four paths (propagation channels). FIG. 6 depicts a simplified functional block diagram of an embodiment of a WFM DBS satellite architecture, comprising the operational principles of an optimization loop 600 at subscriber sites used to perform adaptive equalization of propagation channel effects.

In a similar manner as the embodiment illustrated in FIG. 5, this embodiment of a WFM DBS satellite system 608, in FIG. 6, has four satellite transponders 604 available to transmit signals through a satellite, and as such, the ground uplink segment 602 is capable of transmitting four input signals 616 (denoted by the terms d1, d2, d3, and d4) simultaneously to the four available satellite transponders 604. Initially, this embodiment transforms the two input digital streams, 612 and 614, at the uplink station 602, into four simultaneous WFM digital streams 616 (denoted by terms d1, d2, d3, and d4) by performing wavefront multiplexing 610. Next, the four WFM digital streams 616, at the ground uplink station 602, are transformed to a satellite frequency band by performing the operations of: frequency up-converting 620 the four WFM digital streams 616, to four different carrier frequencies within the Ku satellite frequency band; and amplifying and frequency multiplexing 624 the four frequency up-converted WFM signals 622 by utilizing an output multiplexer at the Ku satellite frequency band. Next, the four transformed Ku band WFM signals 626 are uploaded to the Ku broadcasting satellite.

On the satellite, the received Ku band WFM signals 626 go through the four separated satellite transponders 604, individually and independently, before they are ready for broadcasting to various subscriber terminals 606, thus utilizing 100% of the available space assets. At the subscriber terminals 606, the four received wave-front multiplexed signals 632 at the four separated carrier frequencies are amplified before being frequency down converted to a common IF or base-band. Next, the four down converted signals 634 are processed through an adaptive equalizer 638 that compensates for unbalances on amplitude, phase, and time-delays. Then the equalized signals 640 are feed to a 4-to-4 wavefront de-multiplexer (WFDM) 636 in order to recover the desired digital data streams 628 and 630 (denoted by terms S7' and S8', respectively).

At the ground uplink station 602, as a part of the adaptive equalization 638, some of the inputs of the wave-front multiplexer are "grounded" (specifically the WFM inputs, 618 and 619, which are not connected to a signal to be transmitted). As a result, the outputs, 642 and 644, of the WFDM 640 in the user terminal 606 which correspond to the grounded inputs to the WFM, are connected to the optimization processor 600 to be used for diagnostic in the optimization loop. When adaptive equalization is reached for all the amplitude, phase, and time-delays, at the equalized state, there are no signals detected at any of the diagnostic ports, which for this particular embodiment correspond to the WFDM outputs 642 and 644.

On the other hand, before the four paths are equalized, there are signals leaking into the diagnostic ports corresponding to the WFDM outputs 642 and 644. Therefore, the output powers from the diagnostic ports (referring to the WFDM outputs 642 and 644) are used as an indication of "error" or as a "cost function." In an embodiment of the invention, the sum of the detected power levels from all the diagnostic paths are used as the system "cost function" in an equalization loop. As an optimization loop gradually and adaptively equalizes the four propagation paths, the "error" or the "cost" is continuously reduced.

An embodiment of the optimization scheme using WFM for "cost" function measurement utilizes the following three parts for the equalization mechanisms:
1. diagnostic circuit, which generates the values of the "cost" function;
2. optimization processor (algorithm), which will calculate the complex weights iteratively minimizing the values of cost functions; and
3. compensation circuits, which implement the "complex weighting" used to modify and adjust the amplitudes, phases, and time-shifts of the WFM signals received at the subscriber terminals.

The diagnostic circuit takes advantage of the nature of WFM and WFDM, utilizing the I/O ports to generate the cost function such that the when the paths are fully equalized the cost will become zero. The cost is a positive definite function, and can be defined in an ad hoc fashion (case-by-case), but usually it is defined such that when the M paths (M transponders or channels) are far away from being equalized, the cost is large, and when the M paths (M propagation channels) are nearly equalized, then the cost becomes small.

The optimization processor (algorithm) will dynamically measure the gradient of the cost functions, and it calculates the updated amplitude, phase, and time-shift compensations (i.e., the complex weights) for all the paths accordingly. The optimization processor will iteratively compensate the path differences of the propagation channels, reducing the "cost" until the cost falls below a desired threshold.

The compensation circuits are the real implementation of the amplitude, phase, and time-shift changes on the M signal paths. The compensation circuits can be implemented as a plurality of sets of phase shifters, time shifters, and amplitude attenuations, or I/Q with attenuations, in RF/IF analogue circuits. The compensation circuits may also be implemented in digital domain as a part of digital beam forming (DBF) process.

In another embodiment of the invention, at least one output from the WFDM is used for "observables" measuring the error introduced by the differential drifts among the satellite-channels due to different dynamic propagation effects. Then, the received power levels, in the diagnostic port, are used to derive the components of a cost function, which is "measurable" to calculate the dynamic compensation weight vector (CWV) for propagation effects. In this embodiment, the control input signal does not have to be a ground (zero value) signal.

In addition, when there exist as many input signals to be transmitted as there exits available transponders in a satellite, a control input signal (to be used for the adaptive equalization) can be multiplexed together with one of the input signals into one of the WFM inputs. In yet another embodiment of the invention, for slow varying environments, it is possible to feed back the observable information from the WFDM to the uplink station for pre-compensation of the multi-satellite differential propagation effects.

III-iii) Example of Power Combining Aspect of the Invention

An advantage of this invention is an embodiment that involves a dynamic improvement of radiated power over coverage areas by utilizing additional transponders on a satellite or from different satellites that are not being utilized at their full capacity and that have excessive (unused) radiated power available to be utilized, where the effective dynamic power allocations are utilized and implemented through the ground segment (transmitter segment or uplink segment) only, without affecting the space segment (propagation segment) configuration. For this dynamic power allocation to be successful, the receiving-only terminals must "coherently combine" the radiated power from the various transponders, which is effectively accomplished by the optimization loop comprised of the adaptive equalizer 638, the WFDM 636, and the optimization processor 600.

In this embodiment, an operator, at a ground end of uplink segment 602 or at a program aggregation facility for a DBS service, dynamically allocates equivalent transponder powers 604 according to continuously changing market demands by dynamically including change of relative input powers into ratios of mixtures of the input digital signal streams, in order to improve radiated power of the input digital signal streams being broadcasted without affecting the user end of downlink segment 606 and the space segment, and without modifying satellite configuration.

Figure 7:
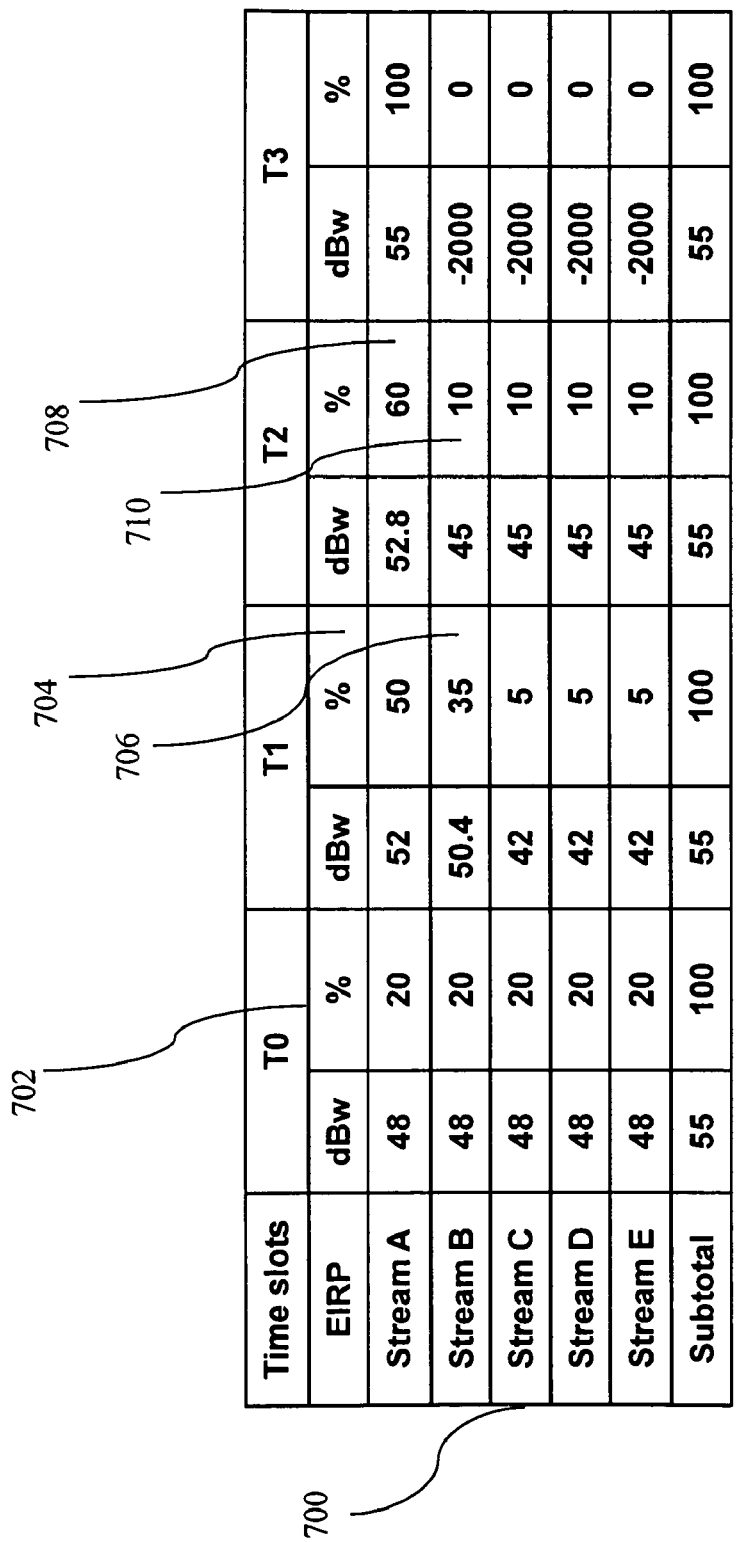
FIG. 7 is a table showing results obtained using a power combining embodiment of the invention.

In general, the input intensity of the input signals streams (from the uplink station) are used to tap the output power of the various transponders from different satellites. The intensities of the input signal streams can be dynamically varied and they do not have to be equal. The following non-limiting example serves as an illustration of a power combining embodiment of the invention. This example assumes, for simplicity, that the transponders are operated in a linear mode with an equal ERIP (radiated power) of 45 decibel watts (dBw), and with a single carrier per stream in each transponder. FIG. 7 is a table 700 showing the results obtained using this example of a power combining embodiment of the invention.

This non-limiting example uses five input signal streams (A, B, C, D, and E), and eight independent transponders. At time $T_0$ all five input streams exhibit equal power 702, as illustrated in FIG. 7. At time $T_1$, an operator at the ground uplink terminal may choose to tap 50% of the total transponders' power 704 for signal stream A, and 35% of the total transponders' power 706 for signal stream B, and 5% of the total transponders' power each for steams C, D and E. The operator may then change to an input mixing at time $T_2$ with 60% of the total power 708 for Stream A, and 10% of the total power 710 for Streams B, C, D, and E, and 100% for Stream A at time slot $T_3$. As a result, all eight transponders will respond and provide amplifications with equivalent output EIRP distributions at $T_0$, $T_1$, $T_2$, and $T_3$, accordingly as illustrated in FIG. 7.

The dynamic allocations of equivalent transponder powers according to the market demand are done usually by an operator or user through the uplink station transmission or program aggregation facility for a DBS service. The power allocation variations may be hourly, or in minutes, or in seconds, depending on the market demand and the number of transponders available. It is the decision of the owners of the DBS service to make the change and allocate the equivalent powers to the transponders. The mechanisms by which the transponder powers are allocated are the ratios of the mixtures of the input signal streams. At an extreme, an operator may turn off some of the input signal streams in favor of allocating more power to the remaining streams and assigning them with higher EIRPs from all the participating satellites.

III-iv) Embodiment of WFM DBS Satellite System Utilizing Multiple Satellites

In another embodiment of the invention, the WFM DBS power combining scheme can be implemented to include transponder assets in multiple satellites at various orbital slots. In this embodiment, the ground uplink stations, or gateway, access multiple satellites via multiple beam antennas or multiple antennas, each pointed to a corresponding satellite. Then, the subscriber terminals cost effectively access the designated multiple satellites via multiple beam antennas. Analog techniques can be used to implement effectively a system to combine transponder powers of say eight individual transponders from two or three satellites and divide the total power into multiple (<8) transponders. Furthermore, implementation using digital baseband approach can be very effective in cases when there are more carriers in a single transponder and the total transponder numbers are greater than 8 (such as 16 or 32).

III-v) Embodiment of Multiple Satellites Backchannel Calibration Using WFM

In still another embodiment of the invention, the WFM and WFDM can be used to perform back channel calibrations on mobile satellite communications with ground-based beam forming features (GBBF). This type of satellite usually employs a large antenna reflector (greater than 10 meters and less than 30 meters) at L- or S-bands, and has hundreds of fully configurable transmit and receive beams, which are essential for delivering services to small mobile and portable devices. With beam forming performed on the ground uplink segment using WFM and WFDM, the cost and time to deliver a highly flexible satellite are significantly reduced, since there are less than 100 feeds on board a satellite associated with the large reflector and there is no beam forming mechanism on board.

This embodiment of the invention combines the equalized amplitudes, equalized phases, and equalized time-delays in the equalized WFM signals with associated optimization techniques in order to perform back channel calibration on mobile satellite communications with ground based beam forming features (GBBF). For receive (Rx) functions the signals captured by the feeds are transported to the ground facility for further processing including beam forming. Similarly for transmit (Tx) function, the ground facility will "calculate" the signals for various feeds based on the multiple beam information.

III-vi) WFM DBS Satellite System Design Example

Figure 8:
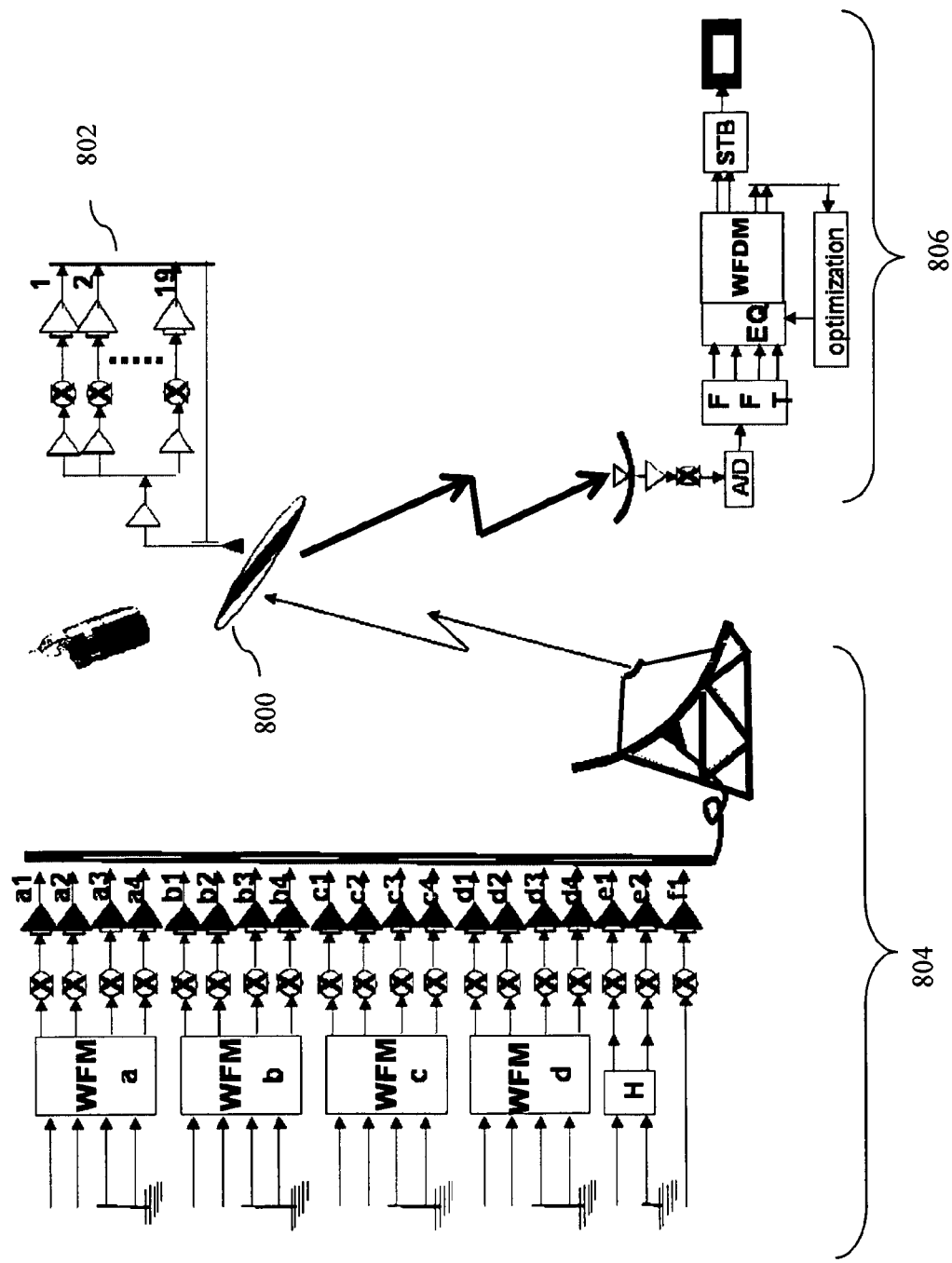
FIG. 8 is an illustrative block diagram depicting an embodiment of the invention used to combine power from available transponders in a retired satellite.

FIG. 8 illustrates the use of an embodiment of the WFM DBS satellite system coupled together with a retired Ku band satellite 800 in orbit, which features 19 transponders 802, each with 36 MHz bandwidth, and with 47 dBW EIRP over a coverage area. This example illustrates how the proposed invention, as shown in FIG. 8, is used to combine the power from available transponders in a retired satellite 800 in order to dynamically match the market need through the ground facility 804, without modifying the satellite 800 operation, and without modifying the receiver segment 806. The embodiment of the invention in FIG. 8 is used to convert the retired Ku band satellite in order to deliver a variety of services equivalent to that of a satellite with the following optional features:

A. 10 transponders
  9 high medium power transponders with 50 dBW EIRP,
  1 low power transponder with 47 dBW EIRP;
  all with 36 MHz Bandwidth A RF front-end has an optional frequency up-converter, a BPF at RF, and an SSPA.

B. 7 transponders
  4 high medium power transponders with 53 dBW EIRP,
  1 high medium power transponders with 50 dBW EIRP,
  1 low power transponder with 47 dBW EIRP;
  all with 36 MHz Bandwidth C. Dynamically allocating the resources equivalent of 7 transponders to 19 transponders as demands arise The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6.

What is claimed:

1. A dynamic communication system suitable for dynamically combining power from a plurality of propagation channels in order to improve power levels of transmitted signals, wherein dynamic power allocation is implemented through a transmitter segment without affecting a receiver segment and a propagation segment, the system comprising a processor, an input coupled with the processor for receiving signals to be transmitted, and a memory coupled with the processor, wherein the memory includes instruction means that are executable by the processor for causing the processor to perform operations of:
  inputting a plurality of signals to be transmitted;
  transforming the input signals by performing a Wavefront-Multiplexing transform (WFM transform);
  transmitting the wavefront multiplexed signals (WFM signals) over a transmission medium through propagation channels, wherein there exist at least as many propagation channels as there exist WFM signals and each WFM signal is transmitted over its own propagation channel;
  receiving the transmitted WFM signals from the propagation channels;
  performing adaptive equalization on received WFM signals in order to account for propagation channel effects, wherein the propagation channel effects comprise dynamic differential propagation effects due to the transmission medium and static differential propagation effects comprising unbalanced amplitudes, unbalanced phases, and unbalanced time-delays between the received WFM signals and the WFM signals outputted by the WFM transform;
  separating equalized WFM signals into individual spatial-domain signals by performing a Wavefront-De-Multiplexing transform (WFDM transform); and
  outputting the individual spatial-domain signals.

2. A dynamic communication system as set forth in claim 1, wherein the input signals are received at a ground end of an uplink segment and the input signals comprise digital signals, analog signals, mixed analog and digital signals, and a plurality of digital signal streams to be transmitted to a satellite with a number of transponders operating at a plurality of frequencies, wherein there exists at least as many transponders in the satellite as there exist received digital signal streams, the system further comprising the operations of:
  transforming, at the uplink segment, the WFM signals to a satellite frequency band, prior to transmitting the WFM signals to a satellite segment;
  uploading, at the uplink segment, transformed WFM signals to the satellite segment;
  transmitting through the satellite transponders, at the satellite segment, the transformed WFM signals to a downlink segment;
  downloading, at the downlink segment, the transformed WFM signals transmitted from the satellite segment;
  processing, at a user end of the downlink segment, the downloaded transformed WFM signals to a base-band frequency resulting in base-band frequency WFM signals, wherein the adaptive equalization is performed on the base-band frequency WFM signals in order to account for propagation channel effects from channels on the transponders of a satellite;
  recovering the individual spatial-domain digital signal streams received from the transmitting subsystem by amplifying, filtering, synchronizing, and demodulating the individual spatial-domain signals from the WFDM; and
  outputting the recovered input digital signal streams.

3. A dynamic communication system as set forth in claim 2, wherein in the operation of separating equalized WFM signals, the WFDM transform equals the unique inverse transform of the WFM transform, whereby the WFDM transform separates the WFM signals into individual spatial-domain signals; and wherein in the operation of transforming input signals by WFM, the transformed WFM signals are uploaded from a ground end of the uplink segment to a satellite via an uplink ground antenna and the WFM transform comprises a number of input ports and a number of output ports, where the number of input ports equals the number of output ports and where the number of output ports equals the number of transponders, and wherein the WFM transform further comprises the operations of:

inputting digital signal streams to the WFM input ports, wherein an individual WFM input port is connected to only one corresponding input digital signal stream;

inputting, at the ground end of uplink segment when there are more transponders than there are input digital signal streams, a control signal into WFM input ports not connected to digital signal streams;

inputting, at the ground end of uplink segment when the number of transponders equals the number of digital signal streams, a control signal into a WFM input port connected to a digital signal stream by time-multiplexing the WFM input port between the control signal and the digital signal stream;

performing an orthogonal functional transformation from a spatial-domain representation of the inputted digital signal streams to a wavefront-domain representation of the inputted digital signal streams, wherein a necessary and sufficient condition of the WFM transform is that the WFM transform has a realizable unique inverse, and wherein the wavefront representation of the received digital signal streams comprises a plurality of output WFM signals, wherein each output WFM signal is comprised of a unique linear combination of all the received spatial-domain digital signal streams inputted into the WFM transform, and wherein the output WFM signals are orthogonal to one another; and outputting the WFM signals to the WFM output ports.

4. A dynamic communication system as set forth in claim 3, wherein the dynamic satellite communication system is a one-way communication system selected from a group consisting of: a direct broadcast service (DBS), a fixed satellite service (FSS), a mobile satellite service (MSS), a ground uplink station broadcasting to a ground downlink station, a ground uplink station broadcasting to a user end of downlink segment or to a network hub, a user end of uplink segment transmitting to a user end of downlink segment, a user end of uplink segment transmitting to a network hub or to a ground downlink station, a network hub transmitting to a ground station, and a network hub transmitting to another network hub.

5. A dynamic communication system as set forth in claim 4, wherein in performing adaptive equalization, a WFM input port connected to a control signal has a corresponding WFDM controlled output port at the user end of downlink segment, wherein the WFDM controlled output ports are used as diagnostic ports, and wherein a cost function is used to measure a difference between controlled input ports and their corresponding diagnostic ports, whereby the cost function is minimal when adaptive equalization is reached, and wherein the operation of performing adaptive equalization further utilizes a gradient cost function, an optimization processor, and an amplitude, phase, and time-delay compensation processor, and wherein adaptive equalization is performed by operations of:

measuring the gradient cost function outputted from the WFDM;

performing optimization processing on the measured gradient cost function by using a steepest descent technique to reach an optimal solution, wherein the optimal solution corresponds to dynamically eliminating unbalanced amplitudes, unbalanced phases, and unbalanced time-delays between the output WFM signals from the WFM transform and the base-band frequency WFM signals at the user end of the downlink segment, and wherein the optimization processor sends equalization control signals to the amplitude, phase, and time-delay compensation processor;

performing amplitude, phase, and time-delay compensation by adjusting the amplitude, phase, and time-delay of the received down-converted WFM signals in accordance to the equalization control signals from the optimization processor in order to reduce the cost function;

separating WFM signals from the adaptive equalization operation into individual spatial-domain signals and control signals by performing a WFDM transform; and iterating, at the user end of downlink segment, between the operations of measuring the gradient cost function, performing optimization processing, performing amplitude, phase, and time-delay compensation, and separating the WFM signals from the adaptive equalization operation, until an optimal solution is reached and the cost function is minimal.

6. A dynamic communication system as set forth in claim 5, wherein an operator, at the ground end of uplink segment or at a program aggregation facility for a DBS service, dynamically allocates equivalent transponder powers according to continuously changing market demands by dynamically including change of relative input powers into ratios of mixtures of the input digital signal streams, in order to improve radiated power of the input digital signal streams being broadcasted, whereby the dynamic power allocation is implemented through the ground end of uplink segment without affecting the user end of downlink segment and the space segment, and without modifying satellite configuration.

7. A dynamic communication system as set forth in claim 6, wherein a plurality of digital signal streams from a transmitting subsystem are transmitted to multiple designated satellites at various orbital slots, wherein the WFM signals are transmitted through a transponder in each satellite, and wherein there exists at least as many transponders available for transmission as there exist received digital signal streams to be transmitted, and wherein the WFM signals are uploaded to designated satellites via a multiple beam antenna, multiple antennas, or a combination of multiple beam antenna with multiple antennas at the ground end of uplink segment, and wherein the multiple designated satellites at various orbital slots are accessed by the user end of downlink segment via a multiple beam antenna.

8. A dynamic communication system as set forth in claim 6, wherein a plurality of input digital signal streams from a transmitting subsystem are transmitted to a plurality of satellite configurations comprised of a satellite, with a number of transponders operating at different frequencies, combined with multiple designated satellites at various orbital slots, wherein the WFM signals are transmitted through a transponder in each satellite, and wherein the WFM signals are uploaded to the multiple satellites via a multiple beam antenna, multiple antennas, or a multiple beam antenna combined with multiple antennas at the ground end of uplink segment, and wherein the multiple designated satellites are accessed by a user end of downlink segment via a multiple beam antenna.

9. A dynamic communication system as set forth in claim 8, wherein the equalized amplitudes, equalized phases, and equalized time-delays in the equalized WFM signals are combined with associated optimization techniques to perform back channel calibration on mobile satellite communications with ground based beam forming features (GBBF).

10. A dynamic communication system as set forth in claim 9, wherein the unique inverse of the WFM transform is equal to the WFM transform and the WFDM transform equals the WFM transform, and wherein the WFM transform is implemented at digital base band in digital format or by analog devices, wherein the analog devices are selected from a group consisting of a Butler Matrix, a Fourier transform pair, and a Hartley transform pair.

11. A dynamic communication system as set forth in claim 10, wherein the operation of performing adaptive equalization utilizes a cost function selected from a group consisting of a difference between a controlled input port and its corresponding diagnostic port, Signal to Noise Ratio (SNR), and Bit Error, and wherein the control signals comprise ground (zero value) signals and the gradient cost function corresponds to a sum of detected power levels at the diagnostic ports of the WFDM, whereby when adaptive equalization is reached the gradient cost function is zero and there are no detectable power levels in the diagnostic ports.

12. A dynamic communication system as set forth in claim 5, wherein the operation of performing adaptive equalization utilizes a cost function selected from a group consisting of a difference between a controlled input port and its corresponding diagnostic port, Signal to Noise Ratio (SNR), and Bit Error.

13. A dynamic communication system as set forth in claim 12, wherein the operation of performing adaptive equalization utilizes control signals comprising ground (zero value) signals, the cost function comprising a difference between a controlled input port and its corresponding diagnostic port, and the gradient cost function comprising a sum of detected power levels at the diagnostic ports of the WFDM, whereby when adaptive equalization is reached the gradient cost function is zero and there are no detectable power levels in the diagnostic ports.

14. A dynamic communication system as set forth in claim 5, wherein the equalized amplitudes, equalized phases, and equalized time-delays in the equalized WFM signals are combined with associated optimization techniques to perform back channel calibration on mobile satellite communications with ground based beam forming features (GBBF).

15. A dynamic communication system as set forth in claim 4, wherein the WFM transform is implemented at digital base band in digital format or by analog devices, wherein the analog devices are selected from a group consisting of a Butler Matrix, a Fourier transform pair, and a Hartley transform pair.

16. A dynamic communication system as set forth in claim 15, wherein the unique inverse of the WFM transform is equal to the WFM transform, and wherein the WFDM transform equals the WFM transform.

17. A dynamic communication system as set forth in claim 3, wherein the dynamic satellite communication system is a two-way communication system further comprising a user end uplink segment and a ground end downlink segment, wherein the user end uplink segment transmits a plurality of digital signal streams to the ground end downlink segment via a satellite, with a number of transponders operating at a plurality of frequencies, by performing the operations of:

transforming, at the user end uplink segment, digital signal streams by performing a WFM transform;

frequency up-converting the output WFM signals to distinct frequency carriers within frequency bands for satellite communications;

amplifying frequency up-converted WFM signals and frequency multiplexing (FDM) the amplified WFM signals by utilizing a standard multiplexer (MUX) at the satellite frequency band;

uploading WFM signals at the satellite frequency band to the satellite via an uplink user antenna;

receiving and frequency translating the carrier frequencies of the WFM signals in the satellite segment;

amplifying and transmitting the frequency translated WFM signals through the satellite transponders to the ground end of downlink segment, whereby all designated transponders in the satellite are being utilized to transmit translated WFM signals;

receiving and amplifying, at the ground end of downlink segment, the frequency translated WFM signals from the transponders;

frequency down-converting the amplified frequency translated WFM signals to a common IF or base-band frequency;

performing adaptive equalization on down-converted WFM signals at the ground end of downlink segment; and separating equalized WFM signals into individual spatial-domain signals by performing a WFDM transform;

recovering the individual spatial-domain digital signal streams transmitted by the user end of uplink segment by amplifying, filtering, synchronizing, and demodulating the individual spatial-domain signals from the WFDM.

18. A dynamic communication system as set forth in claim 17, wherein the two-way satellite communication system comprises fixed satellite services (FSS) and mobile satellite services (MSS), selected from a group consisting of: a ground uplink station communicating with a receiving ground station, a user end segment communicating with another user end segment, a user end segment communicating with a network hub or a ground station, a network hub communicating with a ground station, and a network hub communicating with another network hub.

19. A dynamic communication system as set forth in claim 18, wherein in performing adaptive equalization at the downlink segments, a WFM input port connected to a control signal, at the uplink segment, has a corresponding WFDM controlled output port at the downlink segments, wherein the WFDM controlled output ports are used as diagnostic ports, and wherein a cost function is used to measure a difference between controlled input ports and their corresponding diagnostic ports, whereby the cost function is minimal when adaptive equalization is reached, and wherein the operation of performing adaptive equalization further utilizes a gradient cost function, an optimization processor, and an amplitude, phase, and time-delay compensation processor, and wherein adaptive equalization is performed by operations of:

measuring the gradient cost function outputted from the WFDM at the downlink segments;

performing optimization processing on the measured gradient cost function by using a steepest descent technique to reach an optimal solution, wherein the optimal solution corresponds to dynamically eliminating unbalanced amplitudes, unbalanced phases, and unbalanced time-delays between the output WFM signals from the WFM transform and the base-band frequency WFM signals at the ground end and user end of the downlink segments, and wherein the optimization processor sends equalization control signals to the amplitude, phase, and time-delay compensation processor;

performing amplitude, phase, and time-delay compensation by adjusting the amplitude, phase, and time-delay of the received down-converted WFM signals in accordance to the equalization control signals from the optimization processor in order to reduce the cost function;
separating WFM signals from the adaptive equalization operation into individual spatial-domain signals and control signals by performing a WFDM transform; and
iterating, at the downlink segments, between the operations of measuring the gradient cost function, performing optimization processing, performing amplitude, phase, and time-delay compensation, and separating the WFM signals from the adaptive equalization operation, until an optimal solution is reached and the cost function is minimal.

20. A dynamic communication system as set forth in claim 19, wherein an operator, at the ground end of uplink segment or at the user end of uplink segment, dynamically allocates equivalent transponder powers according to continuously changing market demands by dynamically including change of relative input powers into ratios of mixtures of the input digital signal streams, in order to improve radiated power of the input digital signal streams being transmitted, whereby the dynamic power allocation is implemented through the uplink segment without affecting the downlink segment and the space segment, and without modifying satellite configuration.

21. A dynamic communication system as set forth in claim 20, wherein a plurality of digital signal streams from an uplink segment are transmitted to multiple designated satellites at various orbital slots, wherein the WFM signals are transmitted through a transponder in each satellite, and wherein there exists at least as many transponders available for transmission as there exist received digital signal streams to be transmitted, and wherein the WFM signals are uploaded, at the uplink segments, to designated satellites via a multiple beam antenna, multiple antennas, or a combination of multiple beam antenna with multiple antennas, and wherein the multiple designated satellites at various orbital slots are accessed by the downlink segments via a multiple beam antenna, multiple antennas, or a combination of multiple beam antenna with multiple antennas.

22. A dynamic communication system as set forth in claim 20, wherein a plurality of digital signal streams from the uplink segments are transmitted to a plurality of satellite configurations comprised of a satellite, with a number of transponders operating at different frequencies, combined with multiple designated satellites at various orbital slots, wherein the WFM signals are transmitted through a transponder in each satellite, and wherein the WFM signals are uploaded to the multiple satellites via a multiple beam antenna, multiple antennas, or a multiple beam antenna combined with multiple antennas at the uplink segment, and wherein the multiple designated satellites are accessed by the downlink segments via a multiple beam antenna, multiple antennas, or a combination of multiple beam antenna with multiple antennas.

23. A dynamic communication system as set forth in claim 22, wherein the equalized amplitudes, equalized phases, and equalized time-delays in the equalized WFM signals are combined with associated optimization techniques to perform back channel calibration on mobile satellite communications with ground based beam forming features (GBBF).

24. A dynamic communication system as set forth in claim 23, wherein the unique inverse of the WFM transform is equal to the WFM transform and the WFDM transform equals the WFM transform, and wherein the WFM transform is implemented at digital base band in digital format or by analog devices, wherein the analog devices are selected from a group consisting of a Butler Matrix, a Fourier transform pair, and a Hartley transform pair.

25. A dynamic communication system as set forth in claim 24, wherein the operation of performing adaptive equalization, at the downlink segments, utilizes a cost function selected from a group consisting of a difference between a controlled input port and its corresponding diagnostic port, Signal to Noise Ratio (SNR), and Bit Error, and the control signals comprise ground (zero value) signals and the gradient cost function corresponds to a sum of detected power levels at the diagnostic ports of the WFDM, whereby when adaptive equalization is reached the gradient cost function is zero and there are no detectable power levels in the diagnostic ports.

26. A dynamic communication system as set forth in claim 19, wherein the operation of performing adaptive equalization, at the downlink segment, utilizes a cost function selected from a group consisting of a difference between a controlled input port and its corresponding diagnostic port, Signal to Noise Ratio (SNR), and Bit Error.

27. A dynamic communication system as set forth in claim 26, wherein the operation of performing adaptive equalization utilizes control signals comprising ground (zero value) signals, the cost function comprising a difference between a controlled input port and its corresponding diagnostic port, and the gradient cost function comprising a sum of detected power levels at the diagnostic ports of the WFDM, whereby when adaptive equalization is reached the gradient cost function is zero and there are no detectable power levels in the diagnostic ports.

28. A dynamic communication system as set forth in claim 19, wherein the equalized amplitudes, equalized phases, and equalized time-delays in the equalized WFM signals are combined with associated optimization techniques to perform back channel calibration on mobile satellite communications with ground based beam forming features (GBBF).

29. A dynamic communication system as set forth in claim 17, wherein the WFM transform is implemented at digital base band in digital format or by analog devices, wherein the analog devices are selected from a group consisting of: a Butler Matrix, a Fourier transform pair, and a Hartley transform pair.

30. A dynamic communication system as set forth in claim 29, wherein the unique inverse of the WFM transform is equal to the WFM transform, and wherein the WFDM transform equals the WFM transform.

31. A dynamic communication system as set forth in claim 1, wherein the dynamic communication system is selected from a group consisting of: a wireless communication system, a fiber optical communication system, a wire communication system, a radio frequency communication system, a satellite communication system, a sonar communication system, a radar communication system, a laser communication system, an internet communication system, a communication system between a vehicle and a satellite, a communication system between a least two vehicles, an internal vehicle communication system between the various operating subsystems within a vehicle, and a communication system resulting from a combination of at least two of the communication systems therein.

32. A dynamic communication system as set forth in claim 31, wherein the memory further includes instruction means that are executable by the processor for causing the processor to allow an operator or an automated transmission system, at a transmitter segment, to perform an operation of dynamically allocating equivalent propagation channel powers according to continuously changing application demands by dynamically including change of relative input powers into ratios of mixtures of the input signals, in order to improve radiated power of the input signals being transmitted, whereby the dynamic power allocation is implemented through the transmitter segment without affecting the receiver segment and the propagation segment, and without modifying configuration of propagation apparatus and propagation channels in the propagation segment.

33. A computer implemented method for dynamic communications suitable for dynamically combining power from a plurality of propagation channels in order to improve power levels of transmitted signals, wherein dynamic power allocation is implemented through a transmitter segment without affecting receiver segment and propagation segment, the method comprising an act of causing a processor to perform operations of:
  inputting a plurality of signals to be transmitted;
  transforming the input signals by performing a Wavefront-Multiplexing transform (WFM transform);
  transmitting the wavefront multiplexed signals (WFM signals) over a transmission medium through propagation channels, wherein there exist at least as many propagation channels as there exist WFM signals and each WFM signal is transmitted over its own propagation channel;
  receiving the transmitted WFM signals from the propagation channels;
  performing adaptive equalization on received WFM signals in order to account for propagation channel effects, wherein the propagation channel effects comprise dynamic differential propagation effects due to the transmission medium, and static difference of unbalanced amplitudes, unbalanced phases, and unbalanced time-delays between the received WFM signals and the WFM signals outputted by the WFM transform;
  separating equalized WFM signals into individual spatial-domain signals by performing a Wavefront-De-Multiplexing transform (WFDM transform); and
  outputting the individual spatial-domain signals.

34. A method for dynamic communications as set forth in claim 33, wherein the input signals are received at a ground end of an uplink segment and the input signals comprise digital signals, analog signals, mixed analog and digital signals, and a plurality of digital signal streams to be transmitted to a satellite with a number of transponders operating at a plurality of frequencies, wherein there exists at least as many transponders in the satellite as there exist received digital signal streams, and wherein the processor further performs operations of:
  transforming, at the uplink segment, the WFM signals to a satellite frequency band, prior to transmitting the WFM signals to a satellite segment;
  uploading, at the uplink segment, transformed WFM signals to the satellite segment;
  transmitting through the satellite transponders, at the satellite segment, the transformed WFM signals to a downlink segment;
  downloading, at the downlink segment, the transformed WFM signals transmitted from the satellite segment;
  processing, at a user end of the downlink segment, the downloaded transformed WFM signals to a base-band frequency resulting in base-band frequency WFM signals, wherein the adaptive equalization is performed on the base-band frequency WFM signals in order to account for propagation channel effects from channels on the transponders of a satellite;
  recovering the individual spatial-domain digital signal streams received from the transmitting subsystem by amplifying, filtering, synchronizing, and demodulating the individual spatial-domain signals from the WFDM; and
  outputting the recovered input digital signal streams.

35. A method for dynamic communications as set forth in claim 34, wherein in the operation of separating equalized WFM signals, the WFDM transform equals the unique inverse transform of the WFM transform, whereby the WFDM transform separates the WFM signals into individual spatial-domain signals; and wherein in the operation of transforming received digital signal streams by WFM, the transformed WFM signals are uploaded from a ground end of the uplink segment to a satellite via an uplink ground antenna and the WFM transform comprises a number of input ports and a number of output ports, where the number of input ports equals the number of output ports and where the number of output ports equals the number of transponders, and wherein the WFM transform further comprises the operations of:
  inputting digital signal streams to the WFM input ports, wherein an individual WFM input port is connected to only one corresponding input digital signal stream;
  inputting, at the ground end of uplink segment when there are more transponders than there are input digital signal streams, a control signal into WFM input ports not connected to digital signal streams;
  inputting, at the ground end of uplink segment when the number of transponders equals the number of digital signal streams, a control signal into a WFM input port connected to a digital signal stream by time-multiplexing the WFM input port between the control signal and the digital signal stream;
  performing an orthogonal functional transformation from a spatial-domain representation of the inputted digital signal streams to a wavefront-domain representation of the inputted digital signal streams, wherein a necessary and sufficient condition of the WFM transform is that the WFM transform has a realizable unique inverse, and wherein the wavefront representation of the received digital signal streams comprises a plurality of output WFM signals, wherein each output WFM signal is comprised of a unique linear combination of all the received spatial-domain digital signal streams inputted into the WFM transform, and wherein the output WFM signals are orthogonal to one another; and
  outputting the WFM signals to the WFM output ports.

36. A method for dynamic communications as set forth in claim 35, wherein the dynamic satellite communication method is a one-way communication method used with A dynamic communication system selected from a group consisting of: a direct broadcast service (DBS), a fixed satellite service (FSS), a mobile satellite service (MSS), a ground uplink station broadcasting to a ground downlink station, a ground uplink station broadcasting to a user end of downlink segment or to a network hub, a user end of uplink segment transmitting to a user end of downlink segment, a user end of uplink segment transmitting to a network hub or to a ground downlink station, a network hub transmitting to a ground station, and a network hub transmitting to another network hub.

37. A method for dynamic communications as set forth in claim 36, wherein in performing adaptive equalization, a WFM input port connected to a control signal has a corresponding WFDM controlled output port at the user end of downlink segment, wherein the WFDM controlled output ports are used as diagnostic ports, and wherein a cost function is used to measure a difference between controlled input ports and their corresponding diagnostic ports, whereby the cost function is minimal when adaptive equalization is reached, and wherein the operation of performing adaptive equalization further utilizes a gradient cost function, an optimization processor, and an amplitude, phase, and time-delay compensation processor, and wherein adaptive equalization is performed by operations of:

measuring the gradient cost function outputted from the WFDM;

performing optimization processing on the measured gradient cost function by using a steepest descent technique to reach an optimal solution, wherein the optimal solution corresponds to dynamically eliminating unbalanced amplitudes, unbalanced phases, and unbalanced time-delays between the output WFM signals from the WFM transform and the base-band frequency WFM signals at the user end of the downlink segment, and wherein the optimization processor sends equalization control signals to the amplitude, phase, and time-delay compensation processor;

performing amplitude, phase, and time-delay compensation by adjusting the amplitude, phase, and time-delay of the received down-converted WFM signals in accordance to the equalization control signals from the optimization processor in order to reduce the cost function;

separating WFM signals from the adaptive equalization operation into individual spatial-domain signals and control signals by performing a WFDM transform; and iterating, at the user end of downlink segment, between the operations of measuring the gradient cost function, performing optimization processing, performing amplitude, phase, and time-delay compensation, and separating the WFM signals from the adaptive equalization operation, until an optimal solution is reached and the cost function is minimal.

38. A method for dynamic communications as set forth in claim 37, wherein an operator, at the ground end of uplink segment or at a program aggregation facility for a DBS service, dynamically allocates equivalent transponder powers according to continuously changing market demands by dynamically including change of relative input powers into ratios of mixtures of the input digital signal streams, in order to improve radiated power of the input digital signal streams being broadcasted, whereby the dynamic power allocation is implemented through the ground end of uplink segment without affecting the user end of downlink segment and the space segment, and without modifying satellite configuration.

39. A method for dynamic communications as set forth in claim 38, wherein a plurality of digital signal streams from a transmitting subsystem are transmitted to multiple designated satellites at various orbital slots, wherein the WFM signals are transmitted through a transponder in each satellite, and wherein there exists at least as many transponders available for transmission as there exist received digital signal streams to be transmitted, and wherein the WFM signals are uploaded to designated satellites via a multiple beam antenna, multiple antennas, or a combination of multiple beam antenna with multiple antennas at the ground end of uplink segment, and wherein the multiple designated satellites at various orbital slots are accessed by the user end of downlink segment via a multiple beam antenna.

40. A method for dynamic communications as set forth in claim 38, wherein a plurality of input digital signal streams from a transmitting subsystem are transmitted to a plurality of satellite configurations comprised of a satellite, with a number of transponders operating at different frequencies, combined with multiple designated satellites at various orbital slots, wherein the WFM signals are transmitted through a transponder in each satellite, and wherein the WFM signals are uploaded to the multiple satellites via a multiple beam antenna, multiple antennas, or a multiple beam antenna combined with multiple antennas at the ground end of uplink segment, and wherein the multiple designated satellites are accessed by a user end of downlink segment via a multiple beam antenna.

41. A method for dynamic communications as set forth in claim 40, wherein the equalized amplitudes, equalized phases, and equalized time-delays in the equalized WFM signals are combined with associated optimization techniques to perform back channel calibration on mobile satellite communications with ground based beam forming features (GBBF).

42. A method for dynamic communications as set forth in claim 41, wherein the unique inverse of the WFM transform is equal to the WFM transform and the WFDM transform equals the WFM transform, and wherein the WFM transform is implemented at digital base band in digital format or by analog devices, wherein the analog devices are selected from a group consisting of a Butler Matrix, a Fourier transform pair, and a Hartley transform pair.

43. A method for dynamic communications as set forth in claim 42, wherein the operation of performing adaptive equalization utilizes a cost function selected from a group consisting of a difference between a controlled input port and its corresponding diagnostic port, Signal to Noise Ratio (SNR), and Bit Error, and wherein the control signals comprise ground (zero value) signals and the gradient cost function corresponds to a sum of detected power levels at the diagnostic ports of the WFDM, whereby when adaptive equalization is reached the gradient cost function is zero and there are no detectable power levels in the diagnostic ports.

44. A method for dynamic communications as set forth in claim 37, wherein the operation of performing adaptive equalization utilizes a cost function selected from a group consisting of a difference between a controlled input port and its corresponding diagnostic port, Signal to Noise Ratio (SNR), and Bit Error.

45. A method for dynamic communications as set forth in claim 44, wherein the operation of performing adaptive equalization utilizes control signals comprising ground (zero value) signals, the cost function comprising a difference between a controlled input port and its corresponding diagnostic port, and the gradient cost function comprising a sum of detected power levels at the diagnostic ports of the WFDM, whereby when adaptive equalization is reached the gradient cost function is zero and there are no detectable power levels in the diagnostic ports.

46. A method for dynamic communications as set forth in claim 37, wherein the equalized amplitudes, equalized phases, and equalized time-delays in the equalized WFM signals are combined with associated optimization techniques to perform back channel calibration on mobile satellite communications with ground based beam forming features (GBBF).

47. A method for dynamic communications as set forth in claim 36, wherein the WFM transform is implemented at digital base band in digital format or by analog devices, wherein the analog devices are selected from a group consisting of a Butler Matrix, a Fourier transform pair, and a Hartley transform pair.

48. A method for dynamic communications as set forth in claim 47, wherein the unique inverse of the WFM transform is equal to the WFM transform, and wherein the WFDM transform equals the WFM transform.

49. A method for dynamic communications as set forth in claim 35, wherein the dynamic satellite communication method is a two-way communication method further comprising a user end uplink segment and a ground end downlink segment, wherein the two-way communication method allows the user end uplink segment to transmit a plurality of digital signal streams to the ground end downlink segment via a satellite, with a number of transponders operating at a plurality of frequencies, by further performing the operations of:

transforming, at the user end uplink segment, digital signal streams by performing a WFM transform;
  frequency up-converting the output WFM signals to distinct frequency carriers within frequency bands for satellite communications;
  amplifying frequency up-converted WFM signals and frequency multiplexing (FDM) the amplified WFM signals by utilizing a standard multiplexer (MUX) at the satellite frequency band;
  uploading WFM signals at the satellite frequency band to the satellite via an uplink user antenna;
  receiving and frequency translating the carrier frequencies of the WFM signals in the satellite segment;
  amplifying and transmitting the frequency translated WFM signals through the satellite transponders to the ground end of downlink segment, whereby all designated transponders in the satellite are being utilized to transmit translated WFM signals;
  receiving and amplifying, at the ground end of downlink segment, the frequency translated WFM signals from the transponders;
  frequency down-converting the amplified frequency translated WFM signals to a common IF or base-band frequency;
  performing adaptive equalization on down-converted WFM signals at the ground end of downlink segment; and
  separating equalized WFM signals into individual spatial-domain signals by performing a WFDM transform;
  recovering the individual spatial-domain digital signal streams transmitted by the user end of uplink segment by amplifying, filtering, synchronizing, and demodulating the individual spatial-domain signals from the WFDM.

50. A method for dynamic communications as set forth in claim 49, wherein the two-way satellite communication method is used with a dynamic communication system comprised of fixed satellite services (FSS) and mobile satellite services (MSS), wherein the dynamic satellite communication system is selected from a group consisting of: a ground uplink station communicating with a receiving ground station, a user end segment communicating with another user end segment, a user end segment communicating with a network hub or a ground station, a network hub communicating with a ground station, and a network hub communicating with another network hub.

51. A method for dynamic communications as set forth in claim 50, wherein in performing adaptive equalization at the downlink segments, a WFM input port connected to a control signal, at the uplink segment, has a corresponding WFDM controlled output port at the downlink segments, wherein the WFDM controlled output ports are used as diagnostic ports, and wherein a cost function is used to measure a difference between controlled input ports and their corresponding diagnostic ports, whereby the cost function is minimal when adaptive equalization is reached, and wherein the operation of performing adaptive equalization further utilizes a gradient cost function, an optimization processor, and an amplitude, phase, and time-delay compensation processor, and wherein adaptive equalization is performed by operations of:

measuring the gradient cost function outputted from the WFDM at the downlink segments;
  performing optimization processing on the measured gradient cost function by using a steepest descent technique to reach an optimal solution, wherein the optimal solution corresponds to dynamically eliminating unbalanced amplitudes, unbalanced phases, and unbalanced time-delays between the output WFM signals from the WFM transform and the base-band frequency WFM signals at the ground end and user end of the downlink segments, and wherein the optimization processor sends equalization control signals to the amplitude, phase, and time-delay compensation processor;
  performing amplitude, phase, and time-delay compensation by adjusting the amplitude, phase, and time-delay of the received down-converted WFM signals in accordance to the equalization control signals from the optimization processor in order to reduce the cost function;
  separating WFM signals from the adaptive equalization operation into individual spatial-domain signals and control signals by performing a WFDM transform; and
  iterating, at the downlink segments, between the operations of measuring the gradient cost function, performing optimization processing, performing amplitude, phase, and time-delay compensation, and separating the WFM signals from the adaptive equalization operation, until an optimal solution is reached and the cost function is minimal.

52. A method for dynamic communications as set forth in claim 51, wherein an operator, at the ground end of uplink segment or at the user end of uplink segment, dynamically allocates equivalent transponder powers according to continuously changing market demands by dynamically including change of relative input powers into ratios of mixtures of the input digital signal streams, in order to improve radiated power of the input digital signal streams being transmitted, whereby the dynamic power allocation is implemented through the uplink segment without affecting the downlink segment and the space segment, and without modifying satellite configuration.

53. A method for dynamic communications as set forth in claim 52, wherein a plurality of digital signal streams from an uplink segment are transmitted to multiple designated satellites at various orbital slots, wherein the WFM signals are transmitted through a transponder in each satellite, and wherein there exists at least as many transponders available for transmission as there exist received digital signal streams to be transmitted, and wherein the WFM signals are uploaded, at the uplink segments, to designated satellites via a multiple beam antenna, multiple antennas, or a combination of multiple beam antenna with multiple antennas, and wherein the multiple designated satellites at various orbital slots are accessed by the downlink segments via a multiple beam antenna, multiple antennas, or a combination of multiple beam antenna with multiple antennas.

54. A method for dynamic communications as set forth in claim 52, wherein a plurality of digital signal streams from the uplink segments are transmitted to a plurality of satellite configurations comprised of a satellite, with a number of transponders operating at different frequencies, combined with multiple designated satellites at various orbital slots, wherein the WFM signals are transmitted through a transponder in each satellite, and wherein the WFM signals are uploaded to the multiple satellites via a multiple beam antenna, multiple antennas, or a multiple beam antenna combined with multiple antennas at the uplink segment, and wherein the multiple designated satellites are accessed by the downlink segments via a multiple beam antenna, multiple antennas, or a combination of multiple beam antenna with multiple antennas.

55. A method for dynamic communications as set forth in claim 54, wherein the equalized amplitudes, equalized phases, and equalized time-delays in the equalized WFM signals are combined with associated optimization techniques to perform back channel calibration on mobile satellite communications with ground based beam forming features (GBBF).

56. A method for dynamic communications as set forth in claim 55, wherein the unique inverse of the WFM transform is equal to the WFM transform and the WFDM transform equals the WFM transform, and wherein the WFM transform is implemented at digital base band in digital format or by analog devices, wherein the analog devices are selected from a group consisting of a Butler Matrix, a Fourier transform pair, and a Hartley transform pair.

57. A method for dynamic communications as set forth in claim 56, wherein the operation of performing adaptive equalization, at the downlink segments, utilizes a cost function selected from a group consisting of a difference between a controlled input port and its corresponding diagnostic port, Signal to Noise Ratio (SNR), and Bit Error, and the control signals comprise ground (zero value) signals and the gradient cost function corresponds to a sum of detected power levels at the diagnostic ports of the WFDM, whereby when adaptive equalization is reached the gradient cost function is zero and there are no detectable power levels in the diagnostic ports.

58. A method for dynamic communications as set forth in claim 51, wherein the operation of performing adaptive equalization, at the downlink segment, utilizes a cost function selected from a group consisting of a difference between a controlled input port and its corresponding diagnostic port, Signal to Noise Ratio (SNR), and Bit Error.

59. A method for dynamic communications as set forth in claim 58, wherein the operation of performing adaptive equalization utilizes control signals comprising ground (zero value) signals, the cost function comprising a difference between a controlled input port and its corresponding diagnostic port, and the gradient cost function comprising a sum of detected power levels at the diagnostic ports of the WFDM, whereby when adaptive equalization is reached the gradient cost function is zero and there are no detectable power levels in the diagnostic ports.

60. A method for dynamic communications as set forth in claim 51, wherein the equalized amplitudes, equalized phases, and equalized time-delays in the equalized WFM signals are combined with associated optimization techniques to perform back channel calibration on mobile satellite communications with ground based beam forming features (GBBF).

61. A method for dynamic communications as set forth in claim 49, wherein the WFM transform is implemented at digital base band in digital format or by analog devices, wherein the analog devices are selected from a group consisting of: a Butler Matrix, a Fourier transform pair, and a Hartley transform pair.

62. A method for dynamic communications as set forth in claim 61, wherein the unique inverse of the WFM transform is equal to the WFM transform, and wherein the WFDM transform equals the WFM transform.

63. A method for dynamic communications as set forth in claim 33, wherein the method for dynamic communications is utilized with a dynamic communication system selected from a group consisting of: a wireless communication system, a fiber optical communication system, a wire communication system, a radio frequency communication system, a satellite communication system, a sonar communication system, a radar communication system, a laser communication system, an internet communication system, a communication system between a vehicle and a satellite, a communication system between a least two vehicles, an internal vehicle communication system between the various operating subsystems within a vehicle, and a communication system resulting from a combination of at least two of the communication systems therein.

64. A method for dynamic communications as set forth in claim 63, wherein an operator or an automated transmission system, at a transmitter segment, performs an operation of dynamically allocating equivalent propagation channel powers according to continuously changing application demands by dynamically including change of relative input powers into ratios of mixtures of the input signals, in order to improve radiated power of the input signals being transmitted, whereby the dynamic power allocation is implemented through the transmitter segment without affecting receiver segment and propagation segment, and without modifying configuration of propagation apparatus and propagation channels in the propagation segment.

\* \* \* \* \*